United States Patent
Sakamoto et al.

(10) Patent No.: US 7,367,917 B2
(45) Date of Patent: May 6, 2008

(54) SHIFT CHANGE CONTROL SYSTEM AND AUTOMATIC TRANSMISSION SYSTEM OF AUTOMOBILE

(75) Inventors: Hiroyuki Sakamoto, Hitachinaka (JP); Masahiko Ibamoto, Hitachinaka (JP); Hiroshi Kuroiwa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 269 days.

(21) Appl. No.: 11/344,147

(22) Filed: Feb. 1, 2006

(65) Prior Publication Data

US 2006/0234827 A1   Oct. 19, 2006

(30) Foreign Application Priority Data

Feb. 1, 2005   (JP) ............................. 2005-024940

(51) Int. Cl.
*B60W 10/02*   (2006.01)
(52) U.S. Cl. .......................................................... 477/5
(58) Field of Classification Search .................. 477/5; 475/5, 221; 74/339; 180/65–7
See application file for complete search history.

(56) References Cited

U.S. PATENT DOCUMENTS

| | | | |
|---|---|---|---|
| 2,582,074 A | | 1/1952 | Sebring |
| 5,337,848 A | * | 8/1994 | Bader .......................... 180/65.2 |
| 5,620,393 A | | 4/1997 | Minowa et al. |
| 5,894,758 A | | 4/1999 | Walker |
| 6,159,127 A | * | 12/2000 | Loeffler et al. ................. 477/5 |
| 6,296,592 B1 | * | 10/2001 | Eguchi et al. ................... 477/5 |
| 6,299,563 B1 | * | 10/2001 | Shimasaki ....................... 477/5 |
| 6,603,214 B1 | | 8/2003 | Kayano et al. |
| 6,629,026 B1 | | 9/2003 | Baraszu et al. |
| 6,685,591 B2 | * | 2/2004 | Hanyu et al. .................... 475/5 |
| 6,722,230 B2 | * | 4/2004 | Sakamoto et al. ............. 74/661 |
| 6,976,934 B2 | * | 12/2005 | Komeda et al. ................. 477/5 |
| 7,226,379 B2 | * | 6/2007 | Ibamoto et al. ............. 475/221 |
| 2003/0045389 A1 | | 3/2003 | Kima |

(Continued)

FOREIGN PATENT DOCUMENTS

DE        195 124 A1        3/1996

(Continued)

OTHER PUBLICATIONS

European Search Report dated Jun. 19, 2006.

(Continued)

*Primary Examiner*—Dirk Wright
(74) *Attorney, Agent, or Firm*—Crowell & Moring LLP

(57) ABSTRACT

An automotive shift change control system and automatic transmission system is provided to give passengers a comfortable feeling of shift changing or of driving. A transmission connects a vehicle-driving engine, an electrical rotary machine, and axles via a differential gearbox, transmits the power of the engine to the axles via the electrical rotary machine during a shift change, and conducts the shift change. The automotive shift change control unit that controls the change gear ratio of the transmission includes a driving force controller to control the driving force of the electrical rotary machine, a shift-changing speed controller to send a driving force command from the electrical rotary machine to the driving force controller, and a target shift-changing speed changeover device to output the target shift-changing speed that becomes a target value of the shift-changing speed controlled by the shift-changing speed controller.

14 Claims, 13 Drawing Sheets

U.S. PATENT DOCUMENTS

| | | |
|---|---|---|
| 2004/0116248 A1 | 6/2004 | Sakamoto et al. |
| 2004/0230360 A1 | 11/2004 | Matsumura et al. |

FOREIGN PATENT DOCUMENTS

| | | |
|---|---|---|
| DE | 198 49 156 A1 | 9/1999 |
| DE | 19940288 C1 | 3/2001 |
| DE | 100 37 451 A1 | 4/2001 |
| EP | 0 845 618 A2 | 9/1997 |
| EP | 0845618 A2 | 6/1998 |
| EP | 0 965 776 A2 | 5/1999 |
| EP | 1 429 049 A1 | 6/2004 |
| EP | 1 541 900 A2 | 12/2004 |
| JP | 3-79855 A | 4/1991 |
| JP | 6-307528 | 11/1994 |
| JP | 2002-364742 A | 12/2002 |
| JP | 2003-72403 | 3/2003 |
| JP | 2003-113932 | 4/2003 |
| JP | 2003-291691 A | 10/2003 |

OTHER PUBLICATIONS

English translation of Japanese Office Action dated Jul. 3, 2007 (six (6) pages).

* cited by examiner

1ST-SPEED STATE

PREPARATION FOR SHIFT CHANGE

1ST TORQUE TRANSITION STATE

SPEED TRANSITION STATE

2ND TORQUE TRANSITION STATE

2ND-SPEED STATE

FIG. 9(a)
| | | SHIFT-CHANGING SPEED | |
|---|---|---|---|
| | | FOR RECHARGE | FOR DISCHARGE |
| ELECTRICITY STORAGE LEVEL | SUFFICIENT | REDUCE | INCREASE |
| | INSUFFICIENT | INCREASE | REDUCE |
FIG. 9(b)
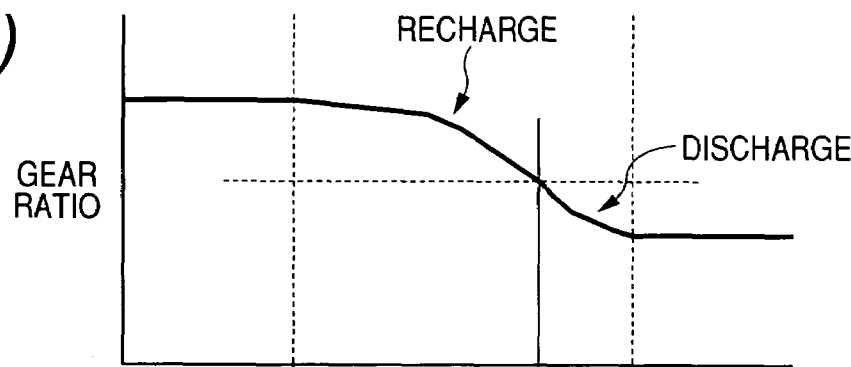
FIG. 9(c)
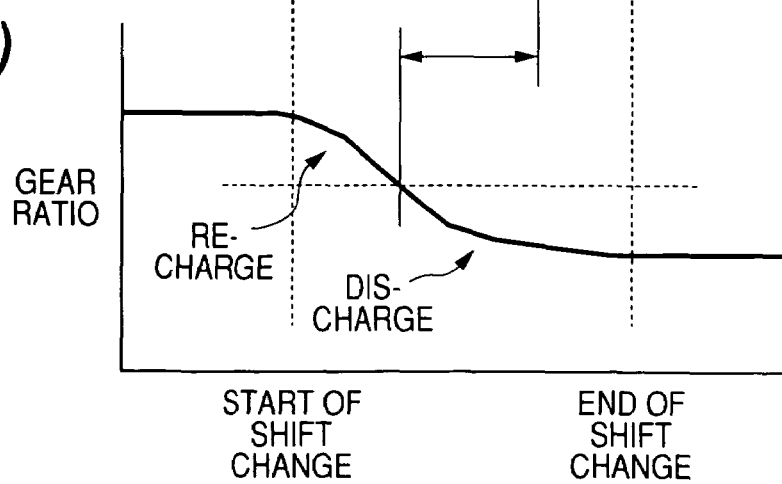

SHIFT CHANGE CONTROL SYSTEM AND AUTOMATIC TRANSMISSION SYSTEM OF AUTOMOBILE

CLAIM OF PRIORITY

The present application claims priority from Japanese application serial No. 2005-024940, filed on Feb. 1, 2005, the contents of which is hereby incorporated by references into this application.

BACKGROUND OF THE INVENTION

1. Field of Technology

The present invention relates generally to shift change control systems and automatic transmission systems of automobiles. More particularly, the invention relates to a shift change control system of an automobile, intended for controlling an automatic transmission system that is a combination of a shift change mechanism and a motor. In addition, the invention is concerned with an automatic transmission system of the automobile.

2. Background of Art

Conventional automatic transmission systems typically employ a planetary-gear-type or parallel-shaft-type transmission to shift gears by selectively engaging one of the independent clutches provided for each gear different in change gear ratio.

As described in, for example, Japanese Application Patent Laid-Open Publication No. 2003-113932, a system is also proposed that implements active shift changing by combining a motor and a parallel-shaft-type transmission with two input shafts.

[Patent Reference 1] Japanese Application Patent Laid-Open Publication No. 2003-113932

SUMMARY OF THE INVENTION

[Problems to be Solved by the Invention]

Such a system as shown in Japanese Application Patent Laid-Open Publication No. 2003-113932 controls motor torque and rotating speed to transmit power to each of the gear trains arranged on the two input shafts. The control makes it possible to conduct progressive shift changing while maintaining the driving force of the vehicle. Progressive shift changing, however, deteriorates response and causes inconvenience such as increasing the load on a motor-driving power supply. Also, a rapid shift change in the case of a geared transmission always causes a change in driving force due to the difference in gear ratio, conveying a feeling of shift changing, to passengers. This feeling of shift changing, although comfortable in some cases, could be uncomfortable in some cases. Additionally, since an abrupt change in motor speed occurs, the engine and other driving sources are loaded and this leads to the deterioration of efficiency.

An object of the present invention is to provide a shift change control system and automatic transmission system of an automobile, capable of giving preferred shift-changing or driving comfort to passengers.

[Means for Solving the Problems]

(1) In order to achieve the above object, an aspect of the present invention is a shift change control system of an automobile. This control system is used for, and adapted to control a change gear ratio of, a transmission that connects a engine for vehicle driving, an electrical rotary machine, and axles via a differential gearbox, and conducts a shift change by transmitting power from the vehicle-driving engine to the axles via the electrical rotary machine during the shift change. The control system includes: driving force control means that controls driving force of the electrical rotary machine; shift-changing speed control means that issues a driving-force command from the electrical rotary machine to the driving force control means; and target shift-changing speed changeover means that outputs a target shift-changing speed as a target value of the shift-changing speed controlled by the shift-changing speed control means.

The above construction of the control system makes it possible to give preferred shift-changing or driving comfort to passengers.

(2) In item (1) above, the target shift-changing speed changeover means is desirably adapted to change over the shift-changing speed according to a particular position of a switch or/and adjusting knob operable by a driver of the automobile, wherein the position of the switch or/and the adjusting knob is a position selected by the driver.

(3) In item (1) above, the target shift-changing speed changeover means is desirably adapted to change over the shift-changing speed according to a particular accelerator angle position of the automobile.

(4) In item (1) above, the target shift-changing speed changeover means is desirably adapted to change over the shift-changing speed according to a particular stepped-on state of a brake pedal of the automobile.

(5) In item (1) above, the target shift-changing speed changeover means is desirably adapted to change over the shift-changing speed according to particular changing speed of the accelerator.

(6) In item (1) above, the shift-changing speed control means is desirably adapted to output the driving force of the electrical rotary machine in accordance with output torque of the engine for vehicle driving, target driving torque of the axles, and various kinds of inertial moment, inclusive of inertial moment of the electrical rotary machine.

(7) In item (1) above, the target shift-changing speed changeover means is desirably adapted to change over the shift-changing speed according to particular output torque of the engine for vehicle driving.

(8) In item (7) above, the driving force control means is desirably adapted to control an output of the electrical rotary machine so that constant torque of the axles is maintained.

(9) In item (1) above, the target shift-changing speed changeover means is desirably adapted to change over the shift-changing speed according to a particular rotating speed of the engine for vehicle driving.

(10) In item (1) above, the driving force control means desirably controls driving force of the electrical rotary machine so that the vehicle-driving engine is maintained at a constant rotating speed.

(11) In item (1) above, the target shift-changing speed changeover means is desirably adapted to change over the shift-changing speed according to a particular ratio between a rotating speed of the vehicle-driving engine and a rotating speed of an output shaft.

(12) In item (1) above, the target shift-changing speed changeover means is desirably adapted to change over the shift-changing speed according to the amount of electricity stored in an electricity storage device.

(13) In item (1) above, the target shift-changing speed changeover means is desirably adapted to change over the shift-changing speed according to a particular transition level of a shift-changing operation.

(14) In order to achieve the above object, another aspect of the present invention is an automatic transmission system of an automobile. The automatic transmission system includes a shift change controller and an actuator which is controlled by the shift change controller. The shift change controller is used for, and adapted to control a change gear ratio of, a transmission that connects a engine for vehicle driving, an electrical rotary machine, and axles via a differential gearbox, and conducts a shift change by transmitting power from the vehicle-driving engine to the axles via the electrical rotary machine during the shift change. The controller includes: driving force control means that controls driving force of the electrical rotary machine; shift-changing speed control means that issues a driving-force command from the electrical rotary machine to the driving force control means; and target shift-changing speed changeover means that outputs a target shift-changing speed as a target value of the shift-changing speed controlled by the shift-changing speed control means.

The above construction of the transmission system makes it possible to give preferred shift-changing or driving comfort to passengers.

[Effects of the Invention]

According to the present invention, shift changes can be performed while maintaining optimum shift-changing or driving comfort according to particular driving conditions of the vehicle.

BRIEF DESCRIPTION OF DRAWINGS

FIG. 9 is an explanatory diagram showing a control state of the automotive shift change control system according to the above embodiment;

DETAILED DESCRIPTION OF THE INVENTION

Description of the Preferred Embodiment

A construction and operation of a shift change control system of an automobile according to an embodiment of the present invention will be described hereunder using FIGS. 1 to 16.

First, a basic configuration of an automobile which uses the automotive shift change control system according to the present embodiment is described below using FIG. 1.

Figure 1:
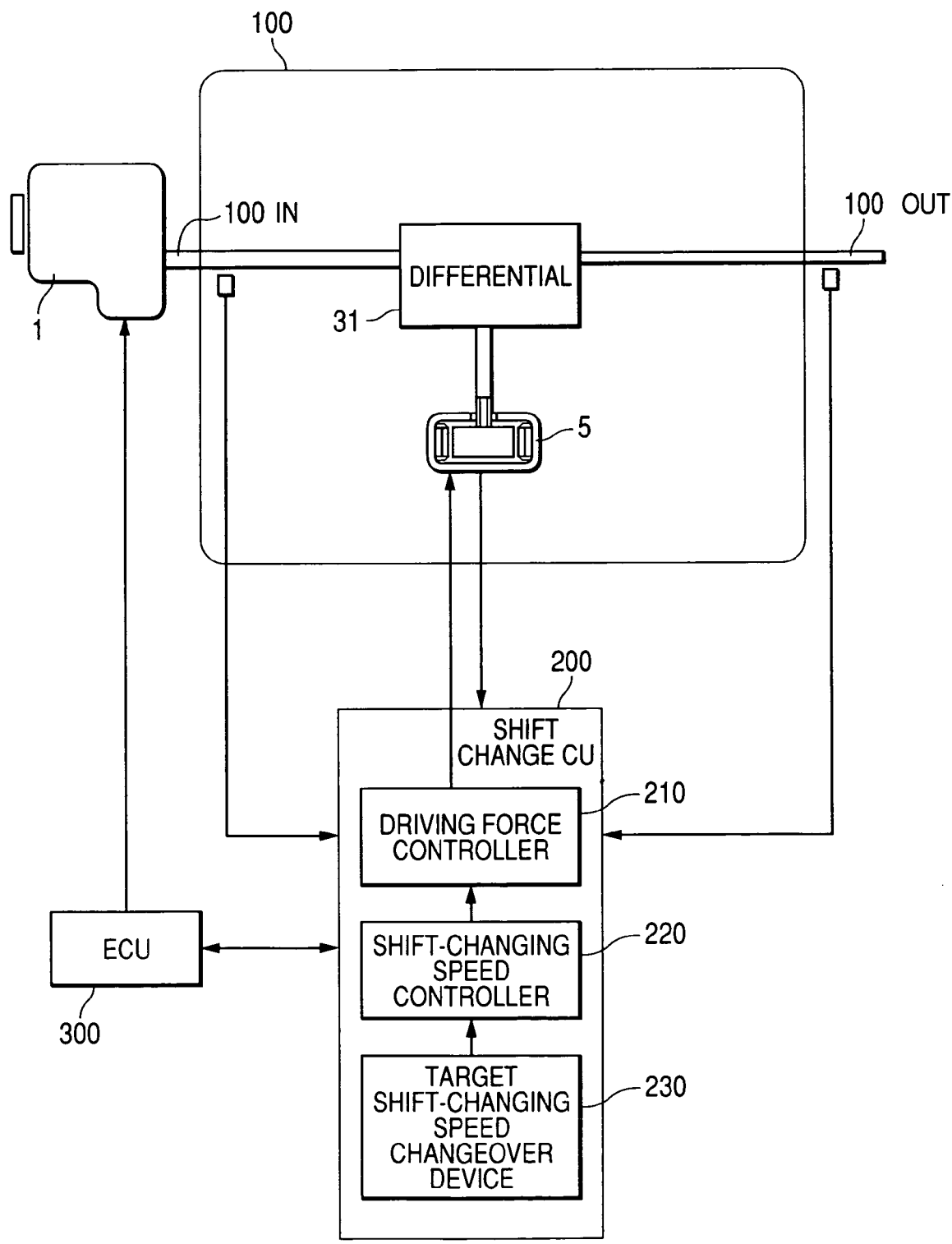
FIG. 1 is a system block diagram showing the basic configuration of the automobile which uses an automotive shift change control system according to an embodiment of the present invention.

FIG. 1 is a system block diagram showing the basic configuration of the automobile which uses the automotive shift change control system according to the present embodiment.

A vehicle-driving engine 1 is coupled with an input shaft 100in of a transmission 100. The vehicle-driving engine 1, although typically considered to be an internal-combustion engine, can be a engine with a rotating shaft, such as a motor. A rotating speed of the vehicle-driving engine 1 is controlled by a vehicle-driving power control unit (ECU) 300. The transmission 100 has its output shaft 100out connected to wheels not shown.

In addition to a gearing and a clutch mechanism, the transmission 100 includes a differential gearbox 31 and an electrical rotary machine 5. Depending on characteristics of the differential gearbox 31, a rotating speed of the wheels is determined by a difference in rotating speed between the electrical rotary machine 5 and the vehicle-driving engine 1. Accordingly, adjusting the rotating speed of the electrical rotary machine 5 changes a rotation ratio between the vehicle-driving engine 1 and the output shaft 100out, thus enabling a shift change. A ratio between the number of revolutions of the input shaft 100in of the transmission 100 (i.e., the rotating speed of the vehicle-driving engine 1) and the number of revolutions of the output shaft 100out of the transmission 100 is termed a "change gear ratio."

Reducing the rotating speed of the electrical rotary machine 5 lessens the difference in rotating speed between the vehicle-driving engine 1 and the output shaft 100out, hence reducing the change gear ratio. A shift change can therefore be conducted by applying rotating force in the direction where the electrical rotary machine 5 is to be reduced in rotating shaft speed.

Also, a shift change control unit (CU) 200 includes a driving force controller 210, a shift-changing speed controller 220, and a target shift-changing speed changeover device 230. The driving force controller 210 is a device that controls driving torque of the electrical rotary machine 5 to the target torque while monitoring an electric current level and other states.

The shift-changing speed controller 220 issues a command to specify a magnitude of the driving force of the electrical rotary machine 5 that is to be output to the driving force controller 210. The shift-changing speed controller 220 usually calculates driving torque from a target value of a rotation ratio change speed and an actual value thereof. Instead of this shift-changing method, the driving torque can be calculated from rotating speeds. For example, this calculation is conducted from the rotating speed of the input shaft 100in, the rotating speed of the output shaft 100out, and an accelerator angle position.

The target shift-changing speed changeover device 230 outputs the target change speed of the rotation ratio between the input and output shafts of the transmission. This target shift-changing speed value changes according to a current change gear ratio, and when the change gear ratio is great, the target change speed is increased. When the change gear ratio is small, the target change speed is reduced. The target value is set up in this way to ensure that synchronization in terms of rotating speed is established to engage the gear located at a next stage. The target shift-changing speed changeover device 230 is provided so that a driver can obtain preferred driving comfort. The shift change control unit (CU) 200 also controls change gear positions by controlling an internal shift actuator of the transmission 100.

A shift-changing speed of the transmission controlled by the shift change control system of the automobile according to the present embodiment will be described below using FIG. 2.

Figure 2:
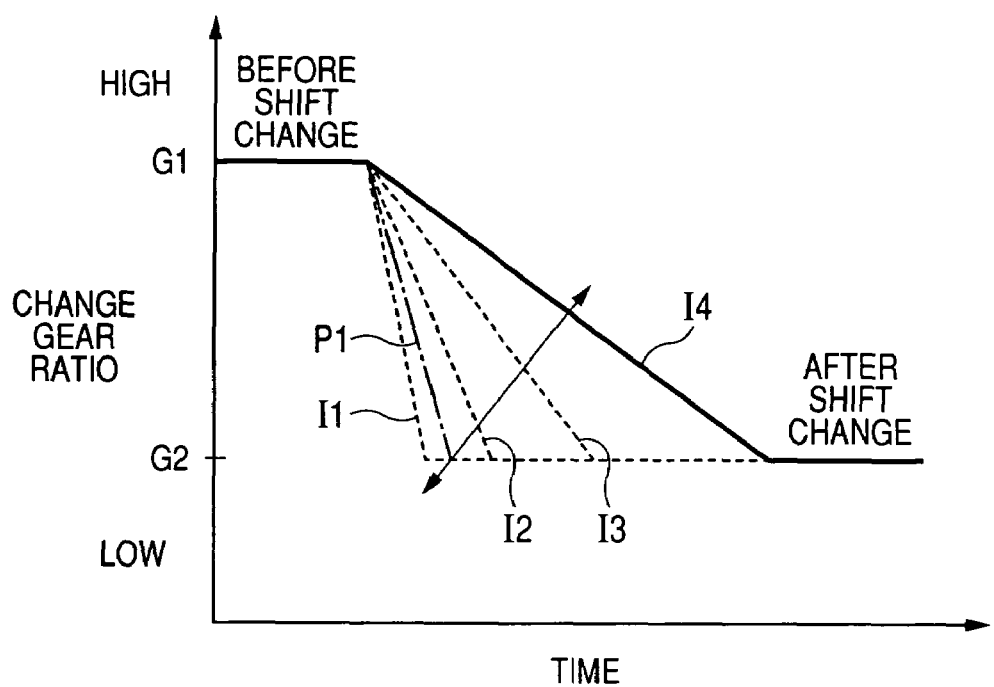
FIG. 2 is an explanatory diagram of the shift-changing speed of the transmission controlled by the shift change control system of the automobile according to the above embodiment.

FIG. 2 is an explanatory diagram of the shift-changing speed of the transmission controlled by the shift change control system of the automobile according to the present embodiment.

A vertical axis in FIG. 2 indicates a change gear ratio, and a horizontal axis indicates time. An example of a shift change from a gear ratio G1 to a gear ratio G2 is described below.

For a normal friction clutch type of transmission system, as denoted by an alternate long and short dash line in FIG. 2, a speed of the shift change from the gear ratio G1 to the gear ratio G2 is determined by clutch characteristics, and is essentially constant. That is to say, the shift-changing speed in this case cannot be controlled to an arbitrary speed.

As denoted by lines I1, I2, I3, and I4 in FIG. 1, however, the shift-changing speed of the system using an electrical rotary machine changes over a wide range, and infinity can even be set as the shift-changing speed.

In the target shift-changing speed changeover device 230 of FIG. 1, the shift-changing speed controlled by the shift-changing speed controller 220 will be set to an arbitrary shift-changing speed, thus enabling the driver to obtain a comfortable feeling of driving.

Next, a conceptual construction of the automobile using the automotive shift change control system according to the present embodiment will be described below using FIG. 3.

Figure 3:
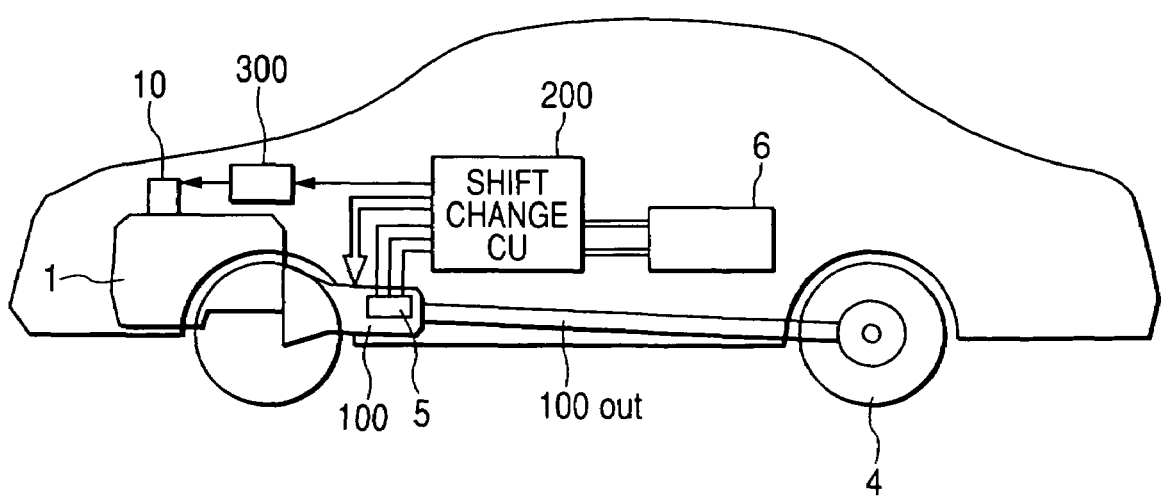
FIG. 3 is a system block diagram showing the conceptual construction of the automobile using the automotive shift change control system according to the above embodiment.

FIG. 3 is a system block diagram showing the conceptual construction of the automobile using the automotive shift change control system according to the present embodiment.

The vehicle-driving engine 1 of the automobile has a connected transmission 100, an output shaft 100out of which drives tires 4 via a differential gear. The transmission 100 contains a motor 5. A shift change control unit (CU) 200 is connected to the motor 5, and a battery 6 is mounted as a power supply for the shift change control unit 200. For example, a lead storage battery or a large-capacity capacitor can be used as the battery 6. As in the present embodiment, a system that uses a motor to conduct active shift changes involves very frequent repetition of recharging and discharge, so independent use of a lead storage battery causes deterioration. However, although recharging and discharge always occur during a shift change, the amounts of electricity stored before and after the shift change do not change significantly. It is therefore possible to mount a large-capacity capacitor as the battery 6. There is no problem, even if this capacitor is mounted in parallel or independently as the battery, provided that its electricity storage capacity and its output capacity are great enough.

The vehicle-driving engine 1 also has an electronically controlled throttle valve 10, which applies a request signal to enable an output of the engine 1 to be controlled. A construction of the vehicle-driving engine 1 is detailed in, for example, Japanese Patent Application No. 2003-405310 earlier filed.

In addition to controlling a torque and speed of the motor 5, the shift change control unit (CU) 200 controls the output of the vehicle-driving engine 1 via the vehicle-driving power control unit (ECU) 300 and the electronically controlled throttle valve 10. The shift change control unit (CU) 200 issues operation commands to the internal shift actuator of the transmission 100.

Next, a more specific construction of the automobile using the automotive shift change control system according to the present embodiment will be described below using FIG. 4.

Figure 4:
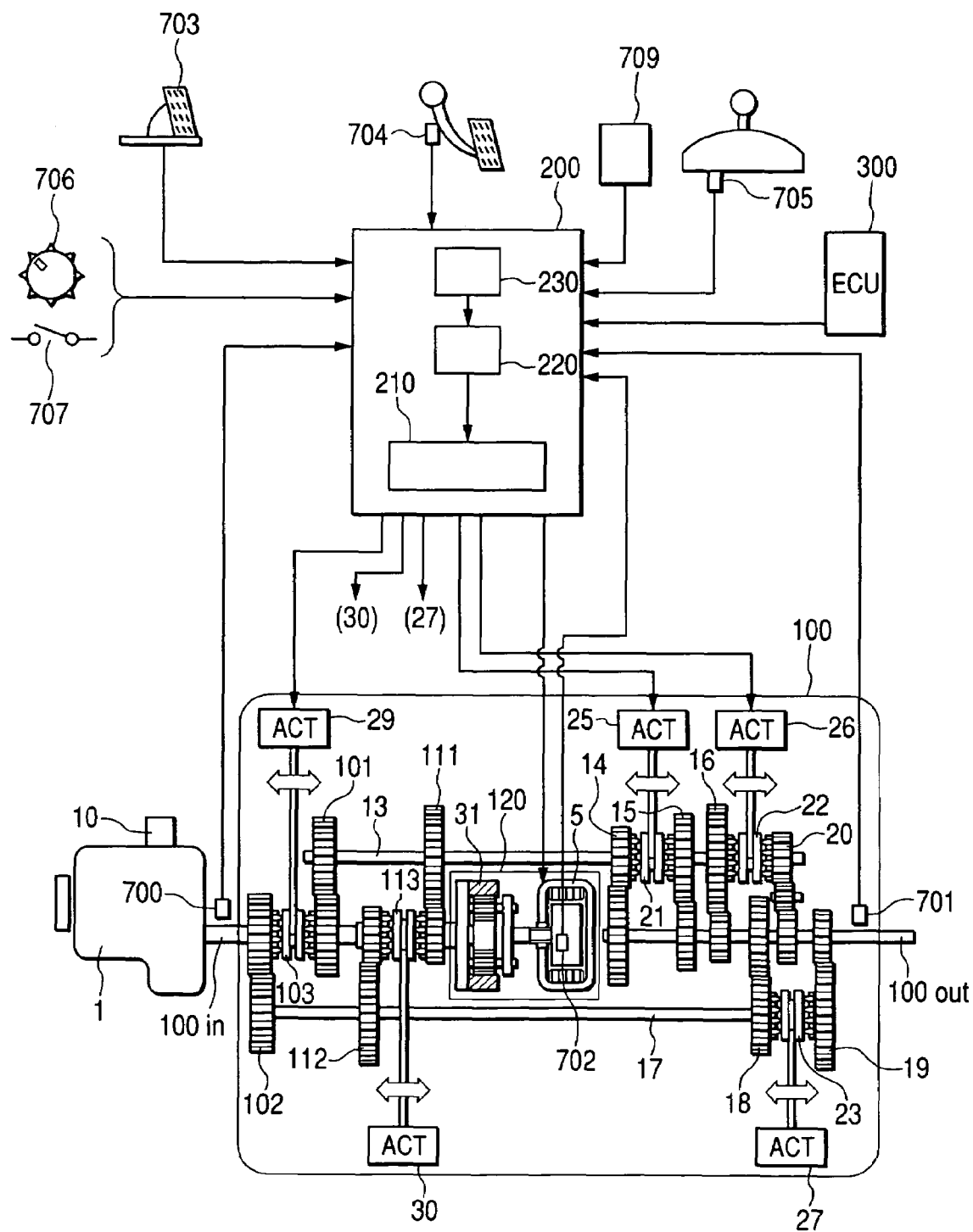
FIG. 4 is a system block diagram showing the specific construction of the automobile using the automotive shift change control system according to the above embodiment.

FIG. 4 is a system block diagram showing the specific construction of the automobile using the automotive shift change control system according to the present embodiment. The transmission 100 shown in FIG. 4 are of the same construction and operation as those described in the application earlier filed as Japanese Patent Application No. 2003-405310 by the present applicant.

Vehicle-driving engine 1 is coupled with an input shaft 100in of the transmission 100. The transmission 100 has its output shaft 100out connected to wheels not shown. The input shaft 100in can transmit driving force to/cut it off between a first intermediate shaft 13 and a second intermediate shaft 17 via a one-way clutch 103. When the intermediate shaft 13 is selected, this intermediate shaft is engaged with the input shaft via a directly coupled gear 101, and when the intermediate shaft 17 is selected, this intermediate shaft is engaged with the input shaft via a directly coupled gear 102. The first intermediate shaft and the second intermediate shaft are connected to the output shaft 100out via one-way clutches 21, 22, 23, by change gears 14, 15, 16, 18, 19, 20.

The one-way clutch 21, 22, 23 is connected to a shift actuator 25, 26, 27, 29, 30, and the one-way clutch is engaged and disengaged by propulsion force of the actuator. The actuators 25, 26, 27, 29, 30 are adapted for general automation use, and these actuators can apply a driving scheme such as a motor or hydraulics. The actuators 25, 26, 27, 29, 30 are controlled by a shift change control unit (CU) 200.

The input shaft 100in is further connected to one of two shafts of a engine 120 for shift changing. The other shaft of the engine 120 is connected to the first intermediate shaft 13 and the second intermediate shaft 17 via a one-way clutch 113 by motor gears 111 and 112.

The shift change engine 120 includes an electric motor 5 and a planetary gearing 31. The motor 5 has a rotating shaft connected to a planetary gear of the planetary gearing 31.

Also, the motor 5 connects the input shaft 100in to a sun gear and connects a ring gear to the changeover sleeve side of a one-way clutch 113. Thus, power of the motor 5 acts on the input shaft 100in and the first or the second intermediate shaft 13 or 17. The motor 5 is made to exert its power inversely against the input shaft and the intermediate shaft. For example, when plus torque is applied to the motor 5, if the input shaft is connected so as to increase its rotating speed, the intermediate shaft is connected so that its torque is exerted for reduced rotating speed.

Shift-changing speed controller 220 outputs a driving force signal to driving force controller 210 on the basis of the input-shaft speed sensor signal input from the input-shaft speed sensor 700 installed on the input shaft 100in of the transmission 100, the output-shaft speed sensor signal input from the output-shaft speed sensor 701 installed on the output shaft 100out, and the motor speed sensor signal input from a motor speed sensor 702 of electrical rotary machine 5. The shift-changing speed controller 220 can control a shift-changing speed according to the rotation ratio represented by the input-shaft speed sensor signal and the output-shaft speed sensor signal.

Depending on driving conditions, the target shift-changing speed changeover device 230 changes over the target shift-changing speed controlled by the shift-changing speed controller 220, thus enabling the driver to obtain a comfortable feeling of driving.

The target shift-changing speed changeover device 230 has various elements, such as sensors and switches, to change over the target shift-changing speed according to the particular driving conditions (vehicle state and driver's intention). More specifically, the target shift-changing speed changeover device 230 can control shift changes by understanding a normal driving intention of the vehicle driver from a state of the driving range input from a driving range position detection sensor 705, and from positions of an adjusting knob 706 and switch 707 operable by the driver. For a transmission having a manual shift position (±) at which the driver can shift up or shift down a gear at desired timing, the state of the driving range refers to a usage state of a normal PRND21 shift position or a usage state of the manual shift position. Also, the driver can change over the target shift-changing speed by operating the adjusting knob 706 or the switch 707. Additionally, the target shift-changing speed changeover device 230 detects an actual driving intention of the driver from an accelerator angle position detection sensor 703 on the basis of the amount of stepping on an accelerator pedal, a stepping-on speed, and the like. The target shift-changing speed changeover device 230 changes over the shift-changing speed according to the actual driving intention of the driver.

The target shift-changing speed changeover device 230 can also conduct control based on the rotating speed signals received from the input-shaft speed sensor 700, the output-shaft speed sensor 701, and the motor speed sensor 702 of the electrical rotary machine 5. The target shift-changing speed changeover device 230 controls the shift-changing speed according to particular driving force by receiving driving-force information of the vehicle-driving engine 1 from the ECU 300 thereof. In addition, the target shift-changing speed changeover device 230 controls the shift-changing speed according to a particular electricity storage state or brake state by receiving associated information from an electricity storage state detector 709 and a brake state detection sensor 704, respectively.

While the present embodiment assumes that the target shift-changing speed changeover device 230 is integrated with the shift-changing speed controller 220 or/and the driving force controller 210, each of these three elements may be an independent device or all of the elements may be included in the shift change control unit 200 or the ECU 300 of the vehicle-driving engine 1. Integrating or splitting these elements, depending on respective states of vehicle mounting and on interface conditions, makes the elements easily mountable in or on an existing vehicle.

The shift change control system of an automobile, shown in FIG. 4, includes: a engine for vehicle driving; a engine for shift changing; an input shaft connected to the engine for vehicle driving; two input gears each provided on the input shaft and each capable of being engaged with/disengaged from the input shaft; a first intermediate shaft; a first driven gear provided on the first intermediate shaft and engaging with one of the input gears; a second intermediate shaft; a second driven gear provided on the second intermediate shaft and engaging with the other input gear; a first change gear train provided on the first intermediate shaft and capable of being engaged with/disengaged from the first intermediate shaft; a second change gear train provided on the second intermediate shaft and capable of being engaged with/disengaged from the second intermediate shaft; a third driven gear train that engages with the first change gear train and the second change gear train; and an output shaft connected in a common fashion to the third driven gear train.

In this system, the engine for shift changing is adapted so that one shaft of this engine is connected to the engine for vehicle driving and so that another shaft of the engine for shift changing is selectively connectable to either the first intermediate shaft or the second intermediate shaft.

Next, details of change gear control by the automotive shift change control system of an automobile according to the present embodiment will be described using FIGS. 5 to 7.

Figure 5:
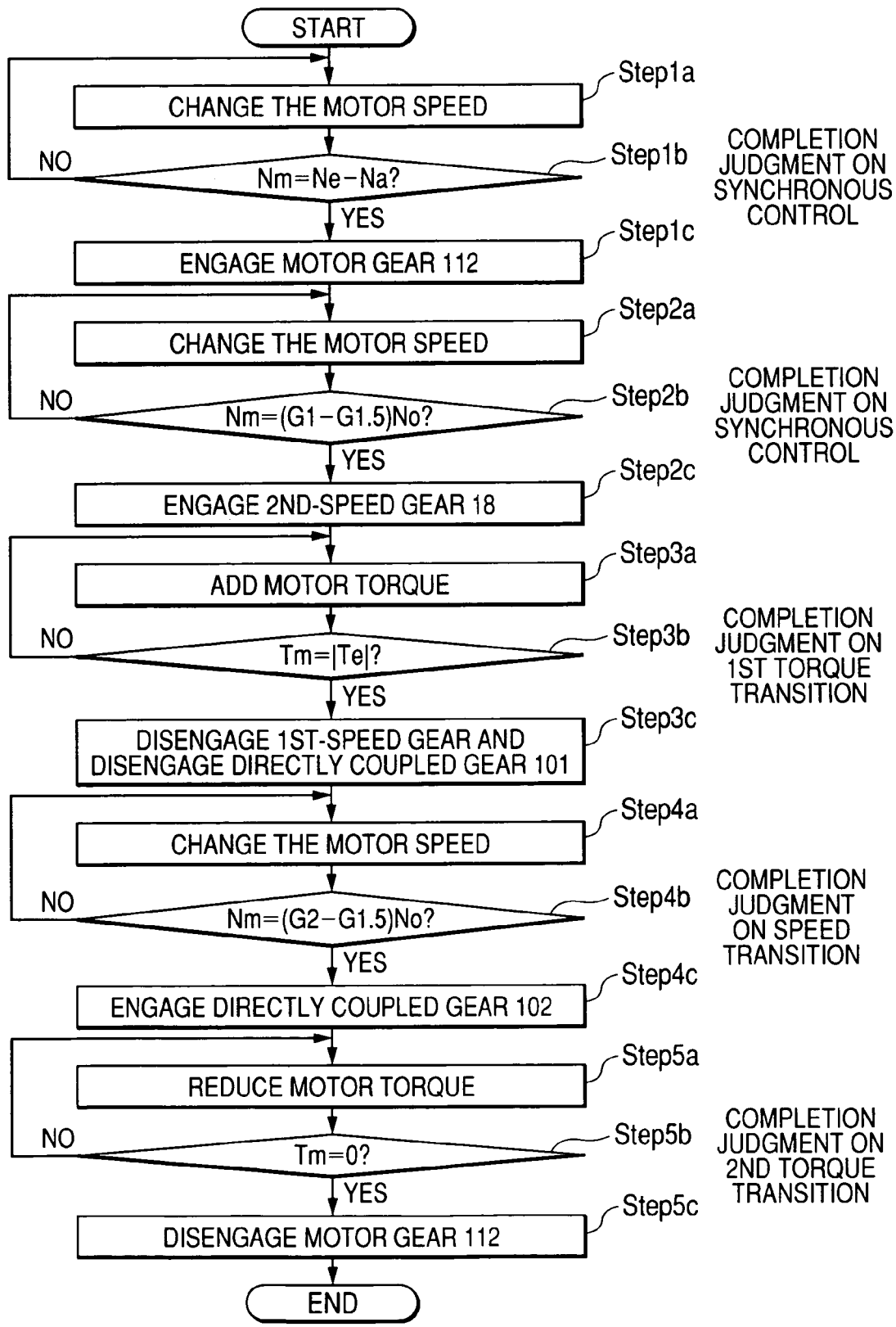
FIG. 5 is a flowchart that shows details of change gear control by the automotive shift change control system according to the above embodiment.
Figure 6A:
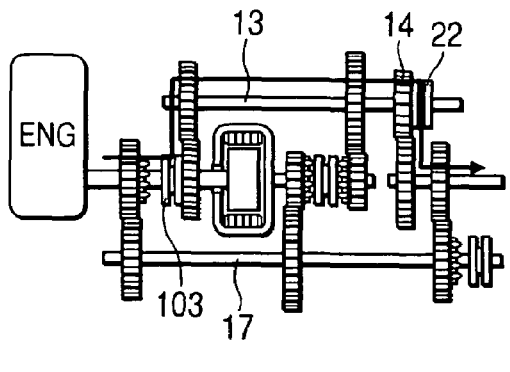
FIG. 6 is a listing of diagrams each showing a route of power transmission during the change gear control by the automotive shift change control system according to the above embodiment.
Figure 6B:
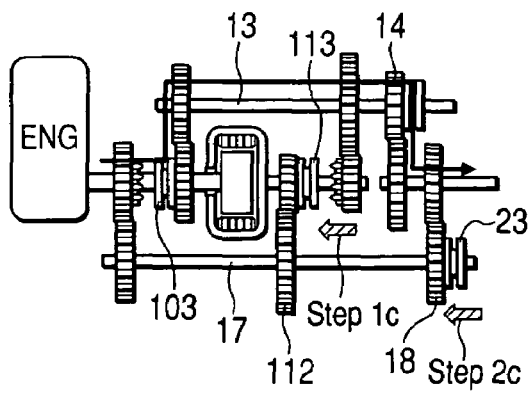
Figure 6C:
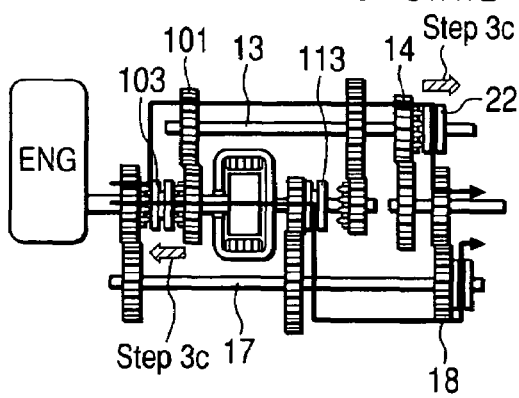
Figure 6D:
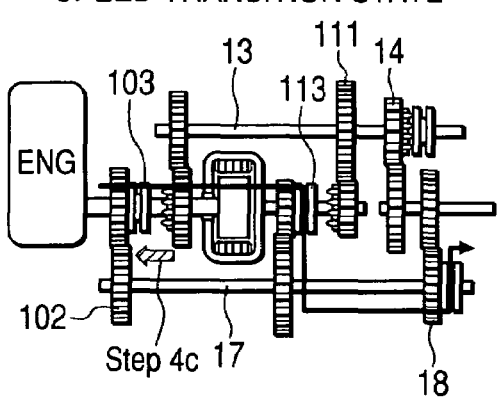
Figure 6E:
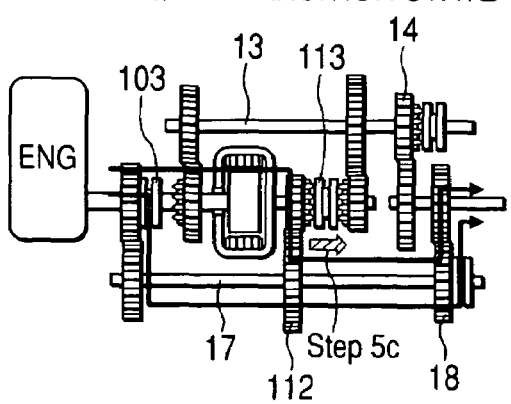
Figure 6F:
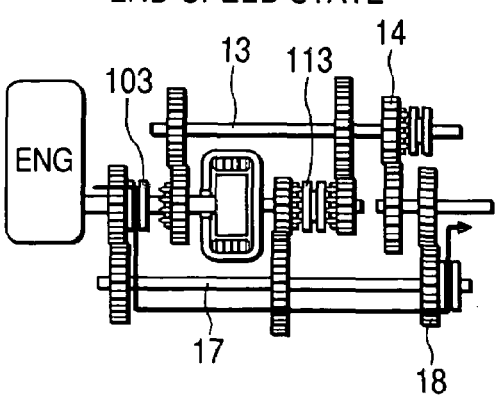

FIG. 5 is a flowchart that shows details of the change gear control by the automotive shift change control system according to the present embodiment. FIG. 6 is a listing of diagrams each showing a route of power transmission during the change gear control by the automotive shift change control system according to the present embodiment. FIG. 7 is a timing chart of the change gear control by the automotive shift change control system according to the present embodiment.

States in gear selection and states in torque change are described below taking power-on first-to-second-gear shift control as an example of upshift control. FIG. 6 shows changes in torque transmission route, and operating conditions of the clutch that engages. FIG. 7 shows torques and speeds of various system constituent elements. In FIG. 7, (A) denotes a throttle angle, (B) a shift change command, (C) an engagement clutch state, (D) an engine speed (Ne), (E) a motor speed (Nm), (F) an output shaft speed (No), (G) an engine torque (Te), (H) a motor torque (Tm), (I) a gear torque, and (J) an output shaft torque (To).

In a first-speed state, as shown in FIG. 6 (a), the vehicle runs with a first-speed gear 14 coupled.

Figure 7:
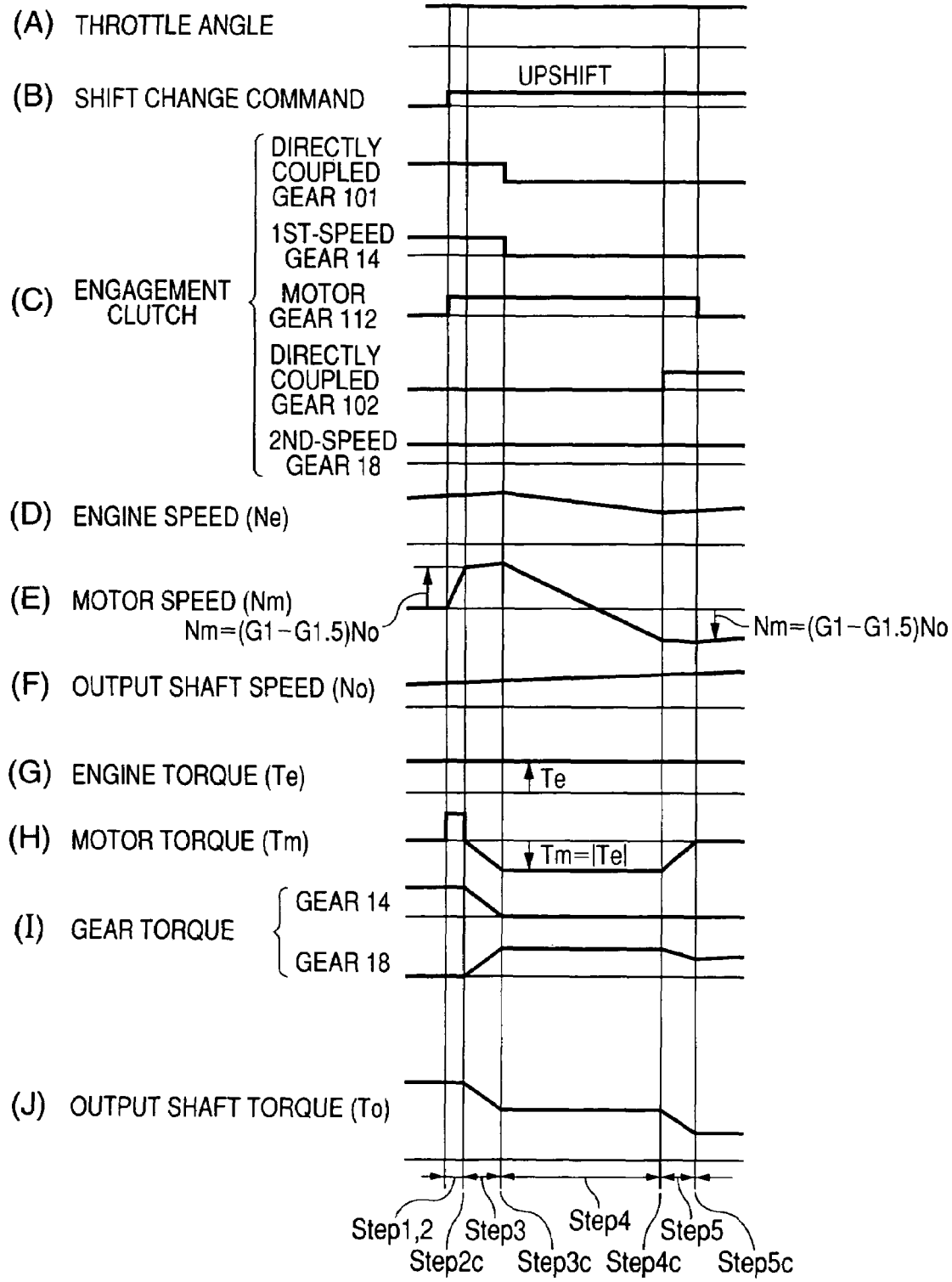
FIG. 7 is a timing chart of the change gear control by the automotive shift change control system according to the above embodiment.

In the first-speed state, as shown in FIG. 7 (E), a driving force controller 210 controls the motor speed in Step 1a of FIG. 5. In Step 1b, the driving force controller 210 changes the motor speed until this controller detects a synchronous state in which the motor speed Nm equals (Engine speed Nm−Second intermediate shaft speed Na). After the detection of the synchronous state, a shift change control unit (CU) 200 operates a one-way clutch 113 in Step 1c as shown in FIG. 6 (b), and engages a motor gear 112 as shown in FIG. 7 (C).

Next, in Step 2a, the driving force controller 210 changes the motor speed, and in Step 2b, the driving force controller 210 changes the motor speed Nm until this controller judges that a second-speed gear 18 has entered a synchronous state in which the motor speed Nm equals (G1−G1.5)No. After the state of "Nm=(G1−G1.5)No" has been established to indicate that the second-speed gear 18 has been judged to be in a synchronous state as shown in FIG. 7 (E), the gear 18 is coupled in Step 2c as shown in FIGS. 6 (b) and 7 (c). Thus, the motor 5 rotates idle at a speed of (N1−N2). Speeds N1, N2 are given as follows by expressions (1), (2):

$$N2 = G1.5 \times No \quad (1)$$

$$N1 = G1 \times No \quad (2)$$

where G1.5 denotes a product of gear ratios of the second-speed gear 18 and the motor gear 112. It follows from expressions (1), (2) that N1>N2 and that (N1−N2) is a plus value.

Next in Step 3a, when, as shown in FIG. 7 (H), the driving force controller 210 increases the motor torque in a minus direction (a direction in which the motor torque acts as driving force on an output shaft, and acts as a load on an engine), the second-speed gear 18 increases in input torque and the first-speed gear decreases in input torque, as shown in FIG. 7 (I). These changes in input torque denote a torque transition process, called a torque phase.

The torque transition process is, as shown in FIG. 6 (c), a torque transition from an intermediate shaft 13 to an intermediate shaft 17. Since the torque transition reduces the motor torque Tm, input torque T2 of the second-speed gear 18 increases and input torque T1 of the first-speed gear 14 decreases, and when Tm=−Te is reached as shown in FIG. 7 (H), T1=0 and T2=Te hold as shown in FIG. 7 (I).

Next, in Step 3b, the driving force controller 210 conducts a completion judgment on an torque phase. The torque phase completion judgment is conducted to judge whether the input torque of the first-speed gear 14 has become zero. However, since an input torque of a gear is usually not directly detectable, when actual motor torque becomes equal to an absolute value of engine torque (Tm=|Te|), the input torque of the gear can be regarded as equal to zero. This, however, requires prior detection or calculation of the engine torque Te. Detailed methods of the detection or calculation are described in, for example, Japanese Application Patent Laid-Open Publication No. Hei 5-240073 that was filed by the present applicant, and Japanese Application Patent Laid-Open Publication No. Hei 6-317242.

When the input torque T1 of the first-speed gear 14 becomes zero, the shift change control unit 200 disengages the gear 14 in Step 3c, as shown in FIG. 7 (C). Since the gear 14 is in a state of T1=0, the gear can be easily disengaged and no operational change occurs in the device that conducts the shift change. Also, a directly coupled gear 101 is disengaged for direct coupling of the second-speed gear, as shown in FIG. 7 (C).

Once the first-speed gear has been disengaged, the engine speed can be changed. In Step 4a, therefore, the driving force controller 210 generates a motor speed changing command, by which, as shown in FIG. 7 (D), the engine speed changes for an input-shaft speed of the second-speed gear. This change is a speed transition process, called the inertia phase shown in FIG. 6 (d).

In the speed transition process, for the upshift from the first-speed gear to the second-speed gear, a decrease in the motor speed with the Tm=−Te state being maintained lowers the motor speed, thus reversing a rotational direction of the motor, and increasing the motor speed in the reversing direction as shown in FIG. 7 (E).

Next, in Step 4b, the driving force controller 210 conducts the inertia phase completion judgment once again. The inertia phase completion judgment in this Step is based on whether the engine speed Nm has synchronized with an input-shaft speed of a next-speed gear. That is to say, when Nm=(G2−G1.5)No, the inertia phase is judged to have been completed. In this expression, G2 denotes the gear ratio of the second-speed gear.

Upon the completion of the inertia phase, the shift change control unit 200 operates a one-way clutch 103, as shown in FIG. 6 (d), and engages a directly coupled gear 102, as shown in FIG. 7 (C). Since the gear 102 is in a synchronous state, the gear can be easily engaged and no operational change occurs in the shift change device.

Next, in Step 5a, the driving force controller 210 reduces the motor torque to zero by generating a motor torque reduction command as shown in FIG. 7 (H), and the engine torque Te that has been transmitted to G1.5 via the motor 5 as shown in FIG. 6 (e) moves to the second-speed gear 18, as shown in FIG. 6 (f).

Next, in Step 5b, the driving force controller 210 detects that the motor torque Tm has become equal to zero as shown in FIG. 7 (H), and thus judges that a second torque phase has been completed.

Finally, in Step 5c, the driving force controller 210 disengages the motor gear 112, thus completing the shift change as shown in FIG. 7 (C). Since the gear 112 is in a Tm=0 state, the gear can be easily disengaged and no operational change occurs in the shift change device.

Next, details of shift-changing speed control by the shift change control system of an automobile according to the present embodiment will be described using FIGS. 8 to 16.

Figure 8:
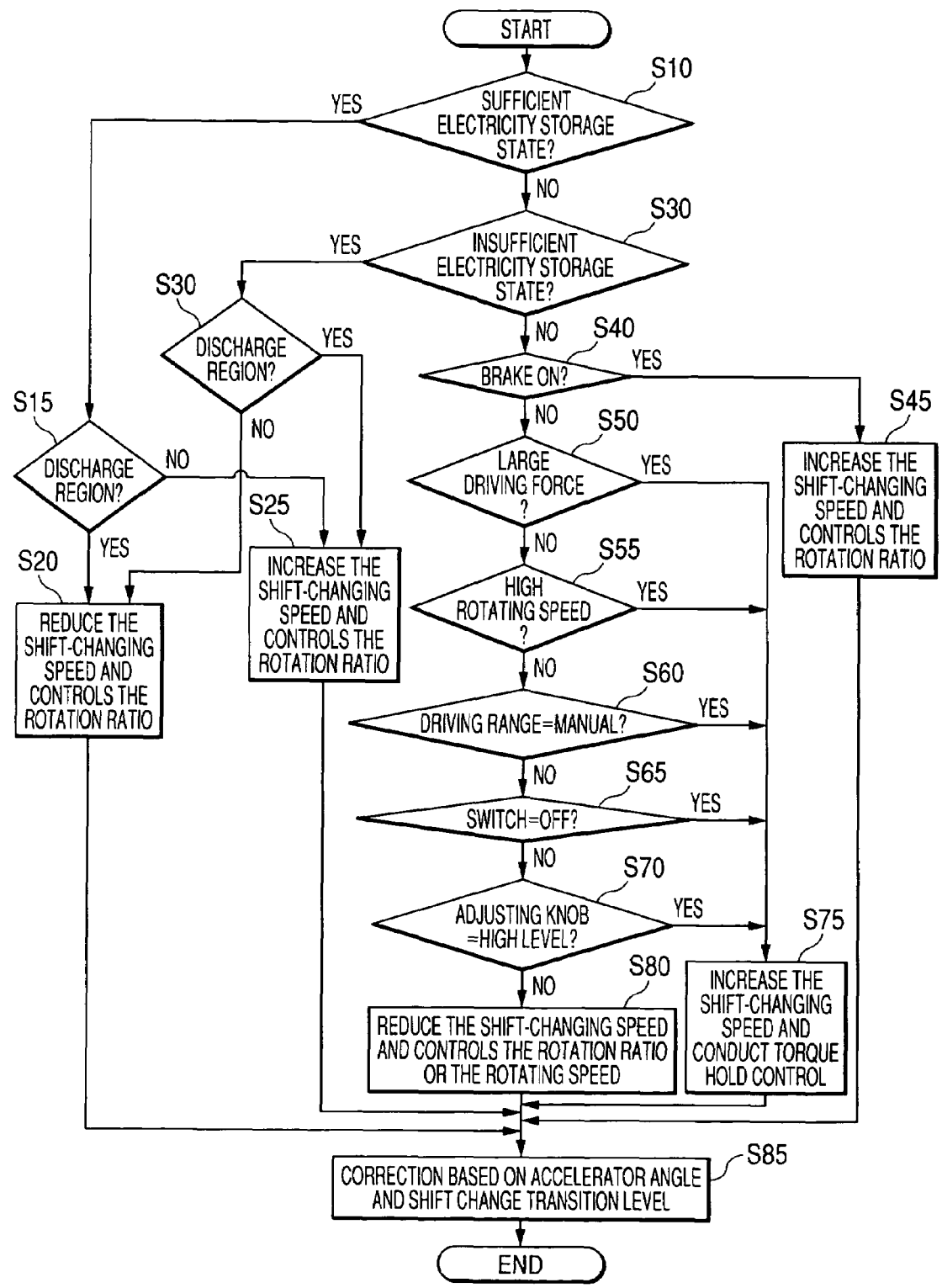
FIG. 8 is a flowchart that shows details of the shift-changing speed control by the automotive shift change control system according to the above embodiment.

FIG. 8 is a flowchart that shows details of the shift-changing speed control by the automotive shift change control system according to the present embodiment. FIGS. 9 to 16 are explanatory diagrams each showing a control state of the automotive shift change control system according to the present embodiment.

In step s10, a target shift-changing speed changeover device 230 judges an electricity storage state of a battery 6. The target shift-changing speed changeover device 230 advances control to step s15 if a large amount of electricity is stored, or otherwise, advances control to step s30.

If a large amount of electricity is stored, the target shift-changing speed changeover device 230 judges in step s15 whether the battery 6 is in a discharged state (discharge region) or in a charged state (charge region). In the system of FIG. 4, the electrical rotary machine 5 conducts a recharge in the first half of a shift change and a discharge in the second half of the shift change. The target shift-changing speed changeover device 230 advances control to step s20 if the battery is in the discharge region, or otherwise, advances control to step s25.

If the judgment results in step s10 indicate that a small amount of is stored, the target shift-changing speed changeover device 230 judges the electricity storage state of the battery 6 in step s30. The target shift-changing speed changeover device 230 advances control to step s35 if the amount of electricity stored is small, or otherwise, advances control to step s40.

If the amount of electricity stored is small, the target shift-changing speed changeover device 230 judges in step s35 whether the battery 6 is in a discharged state (discharge region) or in a charged state (charge region). The target shift-changing speed changeover device 230 advances control to step s25 if the battery is in the discharge region, or advances control to step s20 if the battery is in the charge region.

In step s20, the target shift-changing speed changeover device 230 sets the target shift-changing speed for a decrease in the shift-changing speed, and controls a rotation ratio. In step s25, the target shift-changing speed changeover device 230 sets the target shift-changing speed for an increase in the shift-changing speed, and controls the rotation ratio.

Details of the control in steps s10 to s35 are described below using FIG. 9. FIG. 9 (a) is a diagrammatical summary of the control in steps s10 to s35. FIG. 9 (b) shows the control conducted when the amount of stored electricity is small, and FIG. 9 (c) shows the control conducted when the amount of stored electricity is large.

As shown in FIG. 9 (b), when the amount of stored electricity is small (insufficient), reducing the change speed in the first half of the shift change increases the charge region and increasing the change speed in the second half of the shift change reduces the charge region. The total amount of electricity stored will thus increase.

Conversely, as shown in FIG. 9 (c), when the amount of stored electricity is large (sufficient), the change speed in the first half of the shift change is increased for a reduced amount of recharge and the change speed in the second half of the shift change is increased for an increased amount of discharge. The total amount of electricity stored will thus decrease. Since the shift change is repeated a plurality of times during one driving operation, an integrated amount of electricity storage will be very large, even if changes in the amount of electricity stored per shift change are insignificant. In this way, a stable electricity storage state can be maintained by changing the change rate of the gear ratio according to the particular amount of electricity stored.

As described above, the electrical rotary machine 5 in the system of FIG. 4 conducts a recharge in the first half of the shift change and a discharge in the second half of the shift change. The energy stored in the battery 6 will be used during the recharge and the discharge, so the state of the battery 6 will determine driving performance of the vehicle. The system capable of conducting recharging and discharging operations during shift changes in this manner can autonomously manage the recharging and discharging operations by shifting the gear according to the electricity storage state of the battery 6.

Next, in step s40 of FIG. 8, the target shift-changing speed changeover device 230 confirms a state of a brake. If the brake state is ON, in step s45, the target shift-changing speed changeover device 230 sets the target shift-changing speed for an increase in the shift-changing speed, and controls the rotation ratio. An engine braking effect can thus be augmented.

If the brake state is not ON, the target shift-changing speed changeover device 230 judges in step s50 whether a driving force of the engine is great enough or not. If the driving force is great enough, in step s75, the target shift-changing speed changeover device 230 sets the target shift-changing speed for an increase in the shift-changing speed, and controls the rotation ratio. In addition, the target shift-changing speed changeover device 230 conducts torque hold control to maintain constant torque.

Torque hold control by the automotive shift change control system according to the present embodiment is described in detail below using FIG. 10.

Figure 10:
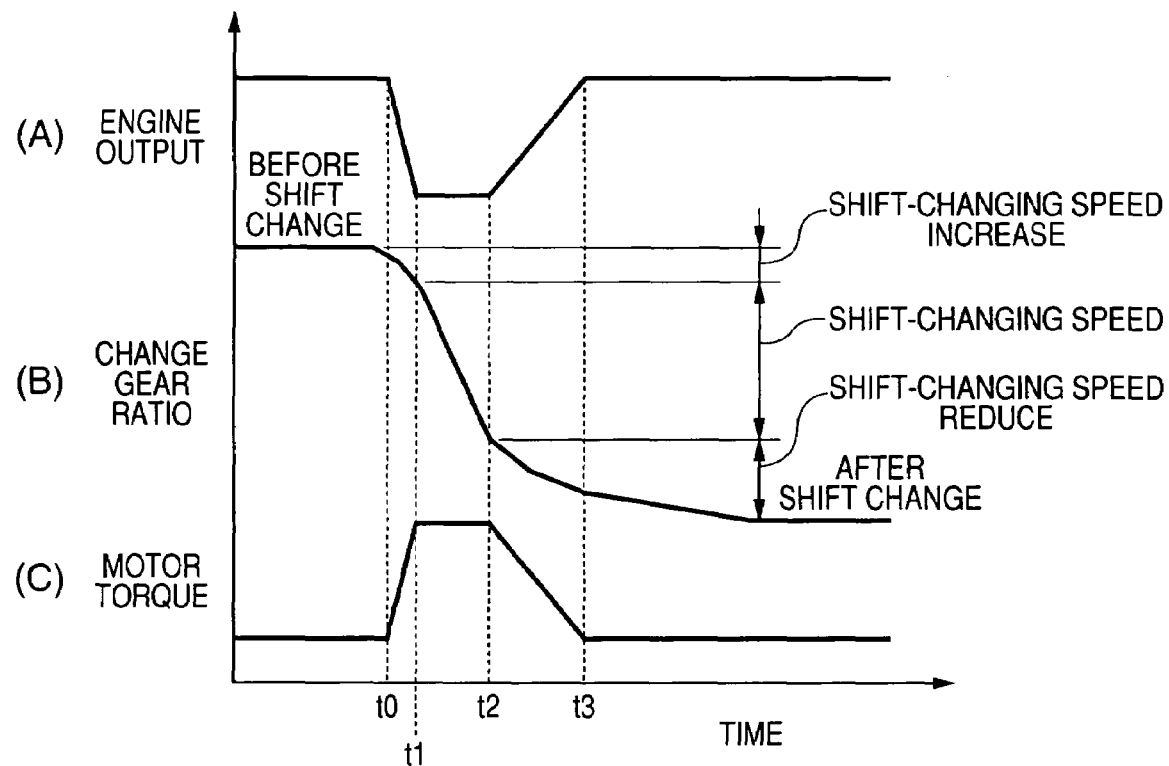
FIG. 10 is an explanatory diagram showing a control state of the automotive shift change control system according to the above embodiment.

FIG. 10 is an explanatory diagram of the torque hold control by the automotive shift change control system according to the present embodiment.

In the system of FIG. 4, the following expression (3) can be used to calculate the output shaft torque To from the output torque Te of the vehicle-driving engine 1 and the output torque Tm of the electrical rotary machine 5 during the shift change:

$$To = Jo \times (-Tm \times Je + Te \times Jm) \times Ga/(Jm \times Jo + Jo \times Je + Ga \times Ga \times Je \times Jm) \quad (3)$$

where To: torque of the output shaft 100out, Jo: inertial moment of the vehicle, Tm: output torque of the electrical rotary machine 5, Jm: inertial moment of the electrical rotary machine 5, Te: output torque of the vehicle-driving engine 1, Je: inertial moment of the vehicle-driving engine 1, and Ga: change gear ratio from the electrical rotary machine 5 to the output shaft 100out.

Hence, even if the output torque Te of the vehicle-driving engine 1 decreases, the torque To of the output shaft 100out can be kept constant by inversely calculating the output torque Tm of the electrical rotary machine 5 from expression (3). The calculation is possible by calculating the target driving force To from the accelerator angle position and then narrowing down the output torque Te via an electronically controlled throttle valve 10 or the like. The reason for that is that the inertial moment Jm of the electrical rotary machine 5, the inertial moment Je of the vehicle-driving engine 1, the inertial moment Jo of the vehicle, and the change gear ratio Ga from the electrical rotary machine 5 to the output shaft 100out are all constant. The following expression (4) holds in that case:

$$Tm = \{To \times (Jm \times Jo + Jo \times Je + Ga \times Ga \times Je \times Jm)/(Jo \times Ga) - Te \times Jm\}/Je \quad (4)$$

If the driving force command from the electrical rotary machine 5, based on such a calculation expression, is constructed inside the shift-changing speed controller 220, and both control based on the change gear ratio, and control based on an output of the vehicle-driving engine 1 are made usable beforehand, the scheme of the shift change that is currently being used can be selectively varied by means of the target shift-changing speed changeover device.

FIG. 10 shows a timing chart of narrowing down the torque of the vehicle-driving engine 1. FIG. 10 (A) shows engine output Te (output of the vehicle-driving engine 1), FIG. 10 (B) shows the change gear ratio, and FIG. 10 (C) shows the motor torque Tm.

A start of the shift change at time t0 activates vehicle-driving power control unit (ECU) 300 to reduce the engine output, as shown in FIG. 10 (A), and activates driving force controller 210 to increase the motor torque, as shown in FIG. 10 (C). The torque To of the output shaft 100out is thus kept constant. At this time, the target shift-changing speed changeover device 230 increases the target shift-changing speed.

At time t2, when the shift change is in a transition state, the vehicle-driving power control unit (ECU) 300 keeps the engine output constant, as shown in FIG. 10 (A), and the driving force controller 210 keeps the motor torque constant, as shown in FIG. 10 (C). The torque To of the output shaft 100out is thus kept constant. At the same time, the target shift-changing speed changeover device 230 maintains the target shift-changing speed at a larger value.

Furthermore, at time t3, when the shift change is completed, the vehicle-driving power control unit (ECU) 300 increases the engine output, as shown in FIG. 10 (A), and the driving force controller 210 reduces the motor torque, as shown in FIG. 10 (C). The torque To of the output shaft 100out is thus kept constant. At the same time, the target shift-changing speed changeover device 230 reduces the target shift-changing speed.

Changing over the output in this manner makes it possible to accelerate the vehicle exactly as intended by the driver, while changing the rotating speed instantly in response to a decrease in the torque of the vehicle-driving engine 1.

Next, in step s55 of FIG. 8, the target shift-changing speed changeover device 230 judges whether the motor speed is high enough or not. If the motor speed is high enough, the target shift-changing speed changeover device 230 advances to step s75 to set the target shift-changing speed for an increase in the shift-changing speed and control the rotation ratio. In addition, the target shift-changing speed changeover device 230 conducts torque hold control to maintain constant torque.

In step s60 of FIG. 8, the target shift-changing speed changeover device 230 also judges whether the vehicle has its driving range set in a manual shift position or not. If the driving range is in the manual shift position, the target shift-changing speed changeover device 230 advances to step s75 to set the target shift-changing speed for an increase in the shift-changing speed and control the rotation ratio. In addition, the target shift-changing speed changeover device 230 conducts torque hold control to maintain constant torque.

More specifically, for a shift change device which, in addition to a normal PRND21 shift position at which a driving range usage state signal is input from a driving range position detection sensor 705, has a manual shift position (±) at which the driver conducts a shift-up or shift-down operation at desired timing, when selection of this manual shift position is detected by the driving range position detection sensor 705, the target shift-changing speed changeover device 230 sets the target shift-changing speed for an increase in the shift-changing speed.

In step s65, the target shift-changing speed changeover device 230 conducts an on/off state judgment on the switch 707 of FIG. 4. If the switch state is on, the target shift-changing speed changeover device 230 advances to step s75 to set the target shift-changing speed for an increase in the shift-changing speed and control the rotation ratio. In addition, the target shift-changing speed changeover device 230 conducts torque hold control to maintain constant torque.

In step s70, the target shift-changing speed changeover device 230 judges a state of the adjusting knob 706 of FIG. 4. If the adjusting knob 706 is set to a position at which the shift-changing speed increases, the target shift-changing speed changeover device 230 advances to step s75 to set the target shift-changing speed for an increase in the shift-changing speed and control the rotation ratio. In addition, the target shift-changing speed changeover device 230 conducts torque hold control to maintain constant torque.

In this fashion, in steps s60 to s70, the target shift-changing speed changeover device 230 can control shift changes by understanding a normal driving intention of the driver from a state of the driving range position detection sensor 705 and from positions of the adjusting knob 706 and the switch 707.

Control based on the states of the adjusting knob and switch of the automotive shift change control system according to the present embodiment is described in detail below using FIG. 11.

Figure 11:
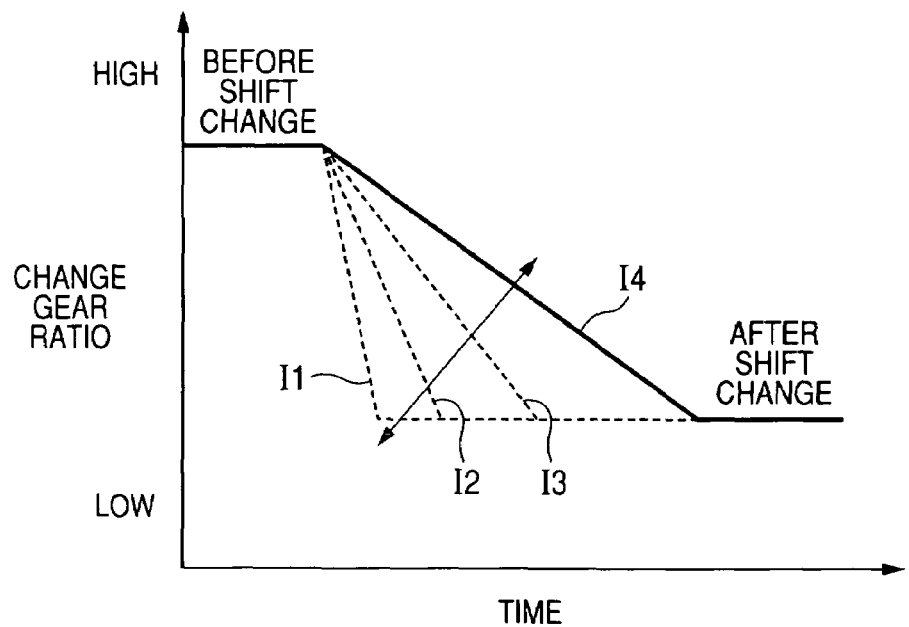
FIG. 11 is an explanatory diagram showing another control state of the automotive shift change control system according to the above embodiment.

FIG. 11 is an explanatory diagram of the control based on the states of the adjusting knob and switch of the automotive shift change control system according to the present embodiment.

As shown in FIG. 11, if the switch 707 is off, the shift-changing speed is reduced, as with a shift-changing speed I4, or if the switch 707 is on, the shift-changing speed is increased, as with a shift-changing speed I1. Also, if the adjusting knob 706 is set to a low level, the shift-changing speed is reduced, as with the shift-changing speed I4, or if the adjusting knob 706 is set to a high level, the shift-changing speed is increased, as with the shift-changing speed I1. When the adjusting knob 706 has four settings inclusive of the small and high levels, the shift-changing speed can also be changed over to I1, I2, I3, or I4, depending on the particular setting of the knob.

If the judgment results in step s70 indicate that the adjusting knob is not set to the high level, the target shift-changing speed changeover device 230 advances to step s80 to reduce the shift-changing speed and control the rotation ratio or the rotating speed.

Details of the control conducted at low shift-changing speed in the automotive shift change control system according to the present embodiment are described below using FIG. 12.

Figure 12:
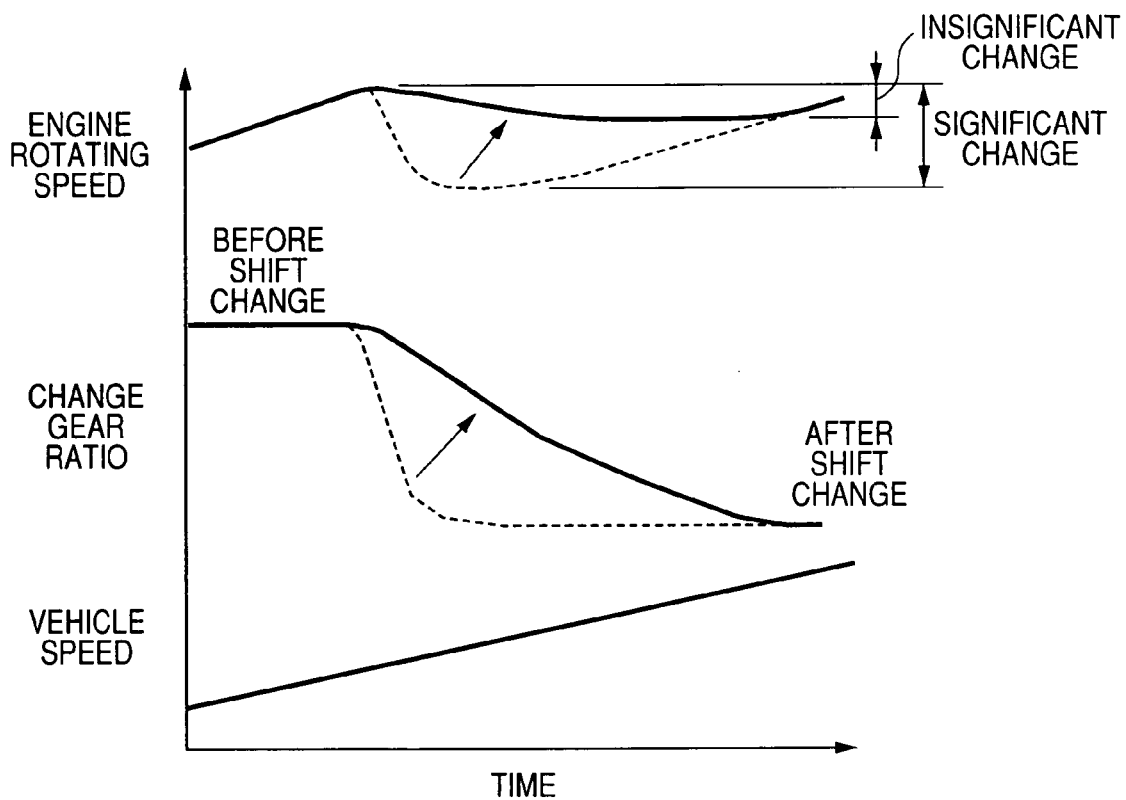
FIG. 12 is an explanatory diagram showing yet another control state of the automotive shift change control system according to the above embodiment.

FIG. 12 is an explanatory diagram of the control conducted at low shift-changing speed in the automotive shift change control system according to the present embodiment.

Increasing the shift-changing speed is suitable for a sharp and sporty drive. A geared transmission, however, does not give a feeling of smoothness, because of significant changes in torque. For example, if the accelerator angle position is low, gradually changing the gear ratio makes it possible to render the driver insensible to timing of the shift change, even when the vehicle has a geared transmission. As a result, the drive can obtain a feeling of smoothness, and hence, a preferred feeling of driving. In addition, if the vehicle-driving engine 1 is provided in an internal-combustion engine, abrupt changes in rotating speed will deteriorate fuel consumption, thus having impacts on environment and on driving costs. It is also important, therefore, to minimize changes in the rotating speed of the vehicle-driving engine 1. The change gear ratio denotes the rotating speed ratio between the rotating shaft and output shaft of the vehicle-driving engine 1. During acceleration of the vehicle, therefore, even when the rotating speed of the vehicle-driving engine 1 is constant, continued transmission of power will increase the output shaft speed and change the gear ratio.

FIG. 12 shows changes in engine rotating speed and in gear ratio, based on the concept described above. FIG. 12 (A) shows the engine rotating speed, FIG. 12 (B) shows the gear ratio, and FIG. 12 (C) shows a speed of the vehicle.

The change gear ratio before and after the shift change is changed with the insignificant change state denoted by a solid line instead of with the abrupt change state denoted by a broken line as shown in FIG. 12 (B). Thus, the rotating speed of the engine which is the vehicle-driving engine 1 can be changed from the abrupt change state of the engine speed, denoted by a broken line, to the insignificant change state denoted by a solid line. In other words, the engine speed can be kept constant. This means that continued use of the very-high-torque region of internal-combustion engines, generally called the torque band, is possible, which leads to no deterioration of power performance.

To cause such insignificant rotational changes as described above, the output torque of the electrical rotary machine 5 requires subtle and precise control. The control can be implemented by conducting calculations based on the rotating speed of the vehicle-driving engine 1, and can use the general control scheme intended to conduct feedback control on a target rotating speed and an actual rotating speed.

Since it is possible, as described above, to conduct a shift change by minimizing changes in the rotating speed and to control the rotating speed, maintaining a constant target rotating speed enables shift changing while keeping the rotating speed of the vehicle-driving engine 1 constant without causing any changes in this rotating speed.

Next, another method of control at low shift-changing speed in the automotive shift change control system according to the present embodiment is described below using FIG. 13.

Figure 13:
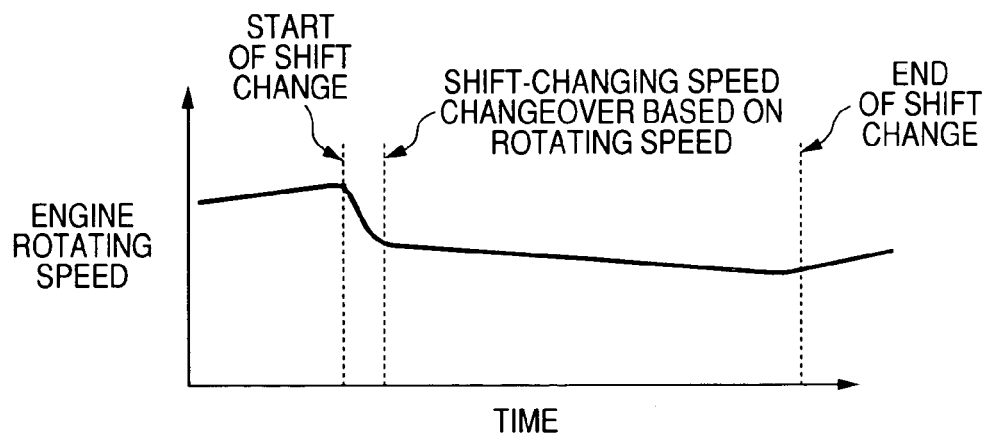
FIG. 13 is an explanatory diagram showing still another control state of the automotive shift change control system according to the above embodiment.

FIG. 13 is an explanatory diagram of another method of control at low shift-changing speed in the automotive shift change control system according to the present embodiment.

The example shown in FIG. 13 relates to conducting control over an entire operational sequence slightly before and after a shift change. In this sequence, the change gear ratio is slightly raised for reduced engine rotating speed in the first half of the shift change, and the gear ratio is controlled for reduced shift-changing speed in the second half of the shift change. During the sequence, the appropriate control can likewise be achieved by lowering the torque of the vehicle-driving engine 1 in the first half during which a high gear ratio can be obtained, or raising the gear ratio to such an extent that the driver will not feel the shift change, even without the gear ratio being lowered.

During the control shown in FIG. 12, since the engine rotating speed is changed progressively, if the rotating speed of the vehicle-driving engine 1 is rotating at too high a speed before the shift change occurs, this high rotating speed could be maintained, resulting in the driver's feeling being degraded by engine noise from the internal-combustion engine, for example. However, raising the change gear ratio for reduced rotating speed in the first half of the shift change, as shown in FIG. 13, makes it possible to improve the driver's feeling.

As described above, smooth shift changes that match various situations can be conducted by changing the shift-changing speed according to the particular rotating speed.

Next, in step s85, the target shift-changing speed changeover device 230 conducts corrections based on an accelerator angle position, on the amount of stepping-on of the brake pedal, and on a transition level of the shift change.

An example of shift-changing speed correction based on an accelerator angle in the automotive shift change control system according to the present embodiment is described below using FIG. 14.

Figure 14:
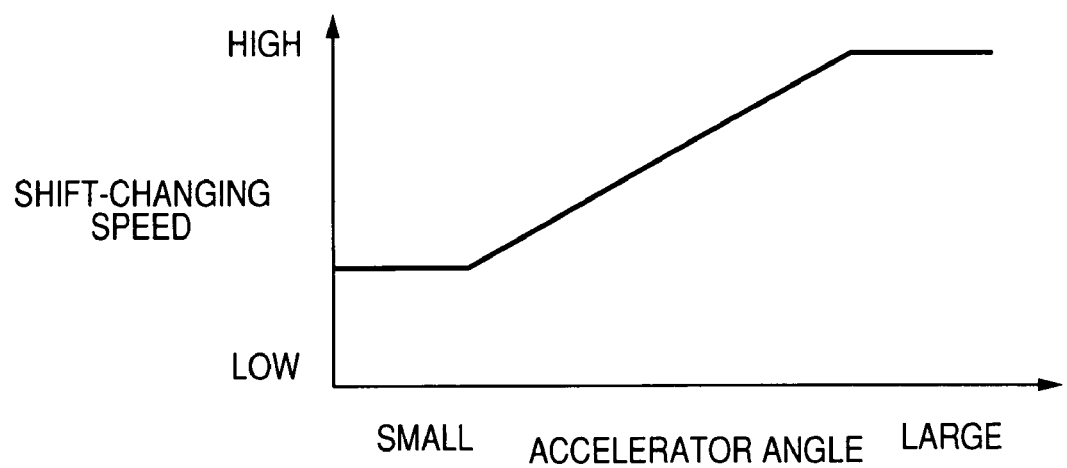
FIG. 14 is an explanatory diagram showing a further control state of the automotive shift change control system according to the above embodiment.

FIG. 14 is an explanatory diagram of the shift-changing speed correction based on the accelerator angle in the automotive shift change control system according to the present embodiment.

FIG. 14 shows the relationship between the accelerator angle and shift-changing speed preferred for the driver. When the accelerator angle is great, the driver is calling for a feeling of acceleration. In this case, there is a need to conduct the shift change that attaches importance to acceleration performance. The drivet's feeling of acceleration can be achieved by not only feeling the acceleration, but also feeling a rapid change in the rotating shaft speed of the vehicle-driving engine 1 as in a racing machine. Accordingly, the target shift-changing speed changeover device 230 acquires an accelerator angle signal and increases the shift-changing speed when the accelerator angle is great, or reduces the shift-changing speed when the accelerator angle is small. Thus, a shift-changing speed favorable for the driver can be obtained.

Another example of shift-changing speed correction based on an accelerator angle in the automotive shift change control system according to the present embodiment is described below using FIG. 15.

Figure 15:
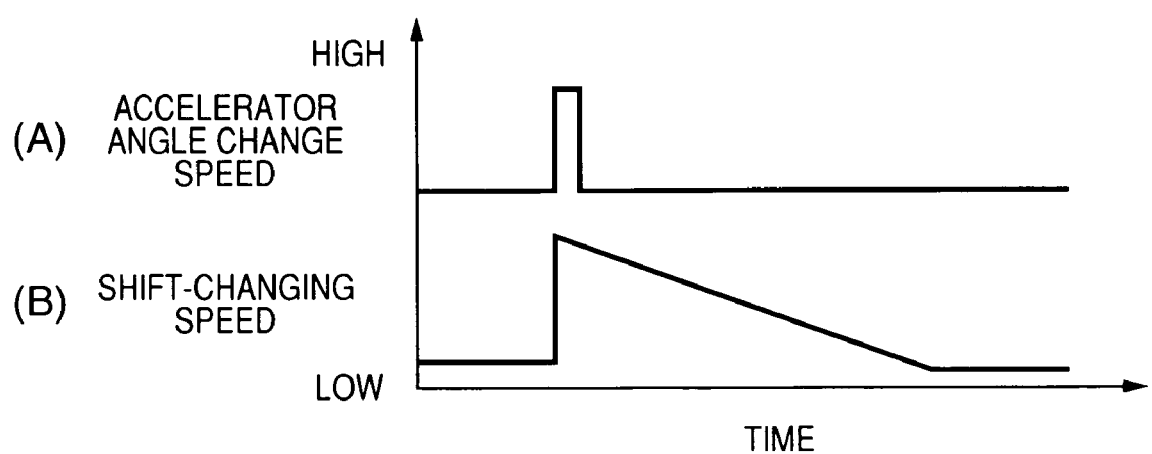
FIG. 15 is an explanatory diagram showing a further control state of the automotive shift change control system according to the above embodiment.

FIG. 15 is an explanatory diagram of another example of shift-changing speed correction based on the accelerator angle in the automotive shift change control system according to the present embodiment.

A shift change with importance attached to acceleration in accordance with an intention of the driver also needs to be conducted when, although the accelerator angle is small, the accelerator pedal is stepped on instantly and rapidly. Accordingly, although the accelerator pedal remains slightly stepped on, if the stepping-on speed (change speed of the accelerator) is high, the target shift-changing speed changeover device 230 acquires the accelerator angle signal and as shown in FIG. 15 (B), keeps the shift-changing speed high for the change speed of the accelerator, shown in FIG. 15 (A), and then gradually reduces the shift-changing speed. Thus, the driver can obtain a favorable shift-changing speed (the driver is expecting rapid response for a brief time by quickly stepping on the accelerator pedal).

Furthermore, since the driver's intension can also be considered during brake operations, when the driver steps on the brake pedal, the shift change control unit 200 conducts a downshift and the target shift-changing speed changeover device 230 detects the amount of stepping-on of the brake pedal. When the amount of stepping-on is great, stronger braking force can be obtained by increasing the change speed of the gear ratio.

An example of shift-changing speed correction based on the transition level of a shift change in the automotive shift change control system according to the present embodiment is described below using FIG. 16.

Figure 16:
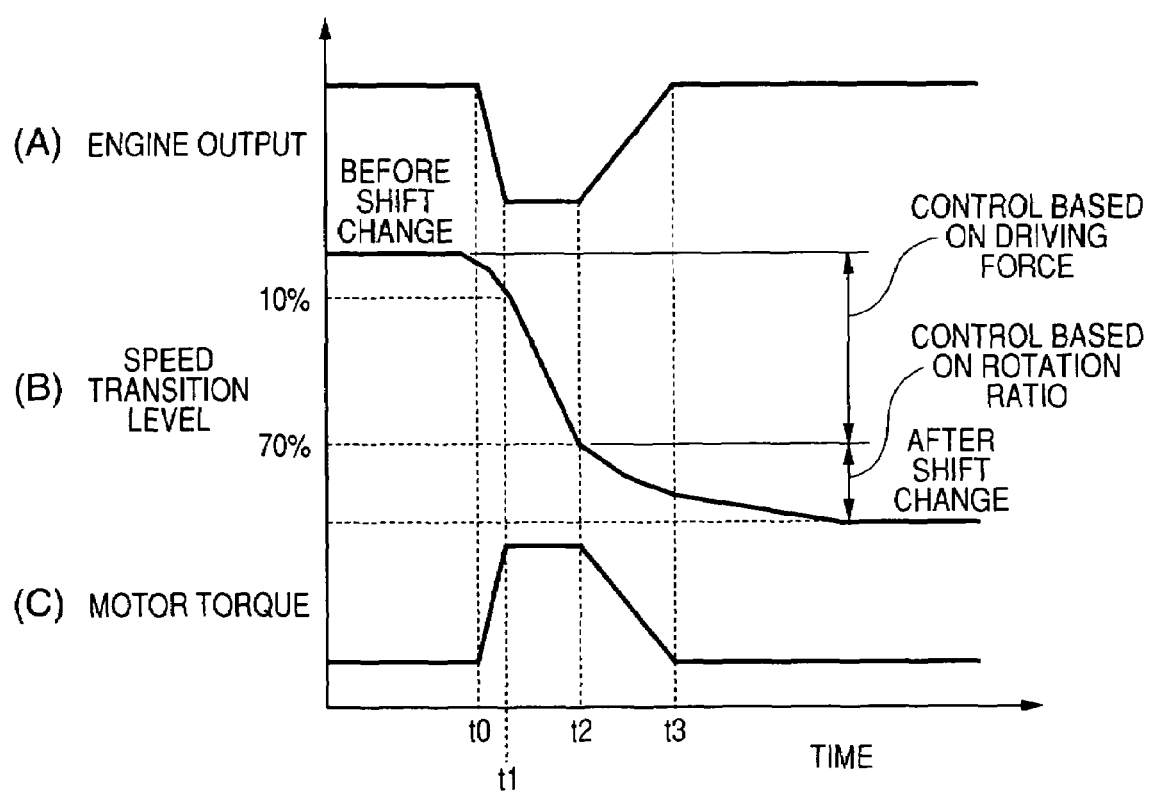
FIG. 16 is an explanatory diagram showing a further control state of the automotive shift change control system according to the above embodiment.

FIG. 16 is an explanatory diagram of the shift-changing speed correction based on the shift change transition level in the automotive shift change control system according to the present embodiment.

When the accelerator angle is great, the rotating speed of the vehicle-driving engine 1 needs to be changed abruptly. In a normal type of internal-combustion engine, an electronically controlled throttle valve 10, a fuel injection rate, and ignition timing are controlled to change an output of a vehicle-driving engine 1. At this time, for an upshift from a first speed to a second speed, controlling the output of the vehicle-driving engine 1 so as to reduce the output will also reduce the driving force of the wheels because of characteristics of a differential gearbox 31. Such a state will be uncomfortable for the driver calling for higher acceleration performance, since the power performance required will not be achievable.

For this reason, timing of the ongoing shift change can also be minutely split during the control started slightly before the shift change and completed slightly after the shift change. For example, in a shift change from the first speed to the second speed, the gear ratio is changed from 3 to 2. For a shift change from a fourth speed to a fifth speed, the gear ratio is changed from 1 to 0.7. Easy control is therefore possible by determining an appropriate shift-changing speed according to the particular transition level of the shift change. Assume that the state (change gear ratio) existing before the shift change occurs is taken as a shift change transition level of 0%, and that the state (change gear ratio) existing after the shift change has occurred is taken as a shift change transition level of 100%. In the system of the present embodiment, the change gear ratio (the ratio between the input shaft speed and output shaft speed of the shift change device) can be changed arbitrarily during a shift change. For example, for a shift change from the first speed to the second speed, the shift change transition level at a gear ratio of 3 is taken as 0%, and the shift change transition level at a gear ratio of 2, as 100%. A shift change transition level of 10% applies for a gear ratio of 2.9, and a shift change transition level of 70% applies for a gear ratio of 2.3. Using the shift change transition level in this way makes it possible to conduct the same control on all gears, since a difference in change gear ratio due to a difference in the kinds of gears used will not change the shift change transition level.

Furthermore, a scheme of changing over the gear ratio according to the particular shift change transition level is effective for conducting control for a change from, for example, a torque-based control state to a rotation-ratio-based control state.

In FIG. 16, (A) denotes engine output. (B) denotes a shift change transition level, and (C) denotes motor torque.

In order to change over the change rate of the shift-changing speed during torque control at a shift change transition level of 10%, during a time interval from t10 to t11, the driving force controller 210 conducts control for increased output torque of the electrical rotary machine 5, as shown in FIG. 16 (C). Also, the vehicle-driving power control unit 300 conducts control for reduced output of the vehicle-driving engine 1, as shown in FIG. 16 (A). During these control actions, the target shift-changing speed changeover device 230 defines the shift-changing speed shown in FIG. 16 (B), as a first shift-changing speed.

At time t11, when the transition level of the shift change becomes 10%, the driving force controller 210 controls the output torque of the electrical rotary machine 5 to a constant value and the vehicle-driving power control unit 300 controls the output of the vehicle-driving engine 1 to a constant value. Additionally, as shown in FIG. 16 (B), the target shift-changing speed changeover device 230 defines the shift-changing speed as a second shift-changing speed higher than the value obtained before time t11.

When the shift change transition level reaches 70%, control based on driving force is changed over to control based on rotation ratio. The changeover may not use a signal such as ON-OFF. Instead, a command(s) for conducting the changeover gradually may be sent to implement the changeover. First, in this latter case, a driving force command, for example, that is based on the change gear ratio of the shift-changing speed controller 220 is multiplied by a coefficient "k" of 1 or less. Next, the value obtained by multiplying calculation results on the driving force command based on the driving force of the vehicle-driving engine 1, by a coefficient of 1−k, is added to thereby obtain the output data that includes each rate. The above changeover can be consequently implemented by changing "k" from 0 to 1, with respect to the shift change transition level.

While the above example relates to the changeover from control based on driving force, to control based on rotation ratio, the shift change transition level can be applied to all cases mentioned above. In addition, if a residual shift change rate, not the shift change transition level, is applied, the value existing before the shift change occurs becomes 100% and the value existing after the shift change has occurred becomes 0%, so an inverse value of the above-mentioned shift change transition level may be usable for setting. The invention here is intended to change over the shift-changing speed by applying a parameter that enables the rate of the shift change to be identified by the same value, even when the kinds of gears used differ.

As set forth above, according to the present invention, it is possible to conduct control according to a particular situation by combining various input information, and thus to obtain the feeling-of-driving that is preferred for the driver.

Next, a more specific construction of the automobile using an automotive shift change control system according to another embodiment of the present invention will be described below using FIG. 17.

Figure 17:
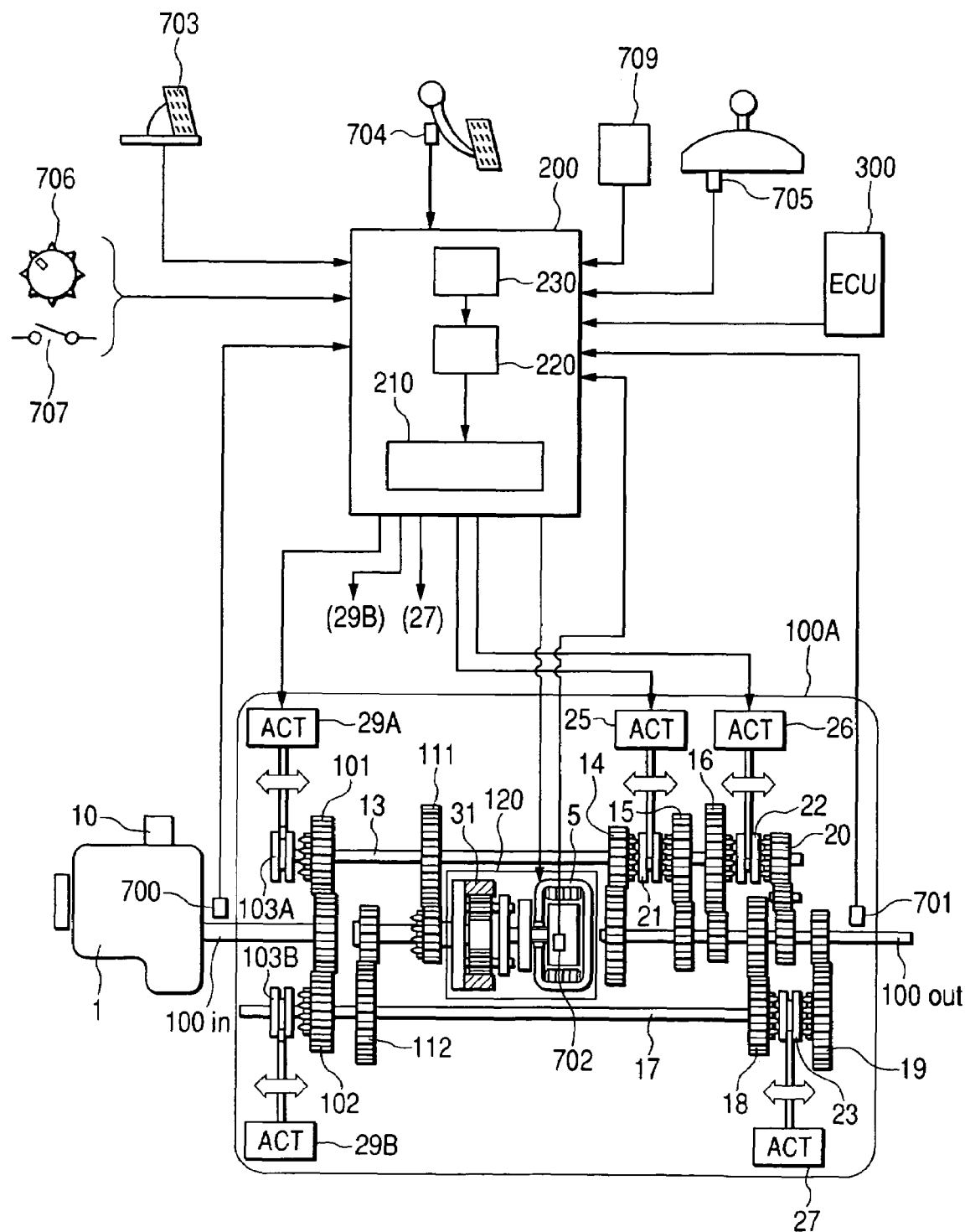
FIG. 17 is a system block diagram showing the specific construction of the automobile using an automotive shift change control system according to another embodiment of the present invention.

FIG. 17 is a system block diagram showing the specific construction of the automobile using the automotive shift change control system according to the present embodiment. The transmission system 100A shown in FIG. 17 are of the same construction and operation as those described in the application earlier filed as Japanese Application Patent Laid-Open Publication. No. 2003-113932 by the present applicant. Also, a basic construction of the automobile using the automotive shift change control system according to the present embodiment is the same as the construction shown in FIG. 1, and a conceptual construction of the automobile using the automotive shift change control system according to the present embodiment is the same as the construction shown in FIG. 3. In addition, a basic construction of the automotive shift change control system is the same as for FIG. 4, An input shaft 100in of the transmission system 100A can transmit driving force to/cut it off between a first intermediate shaft 13 and a second intermediate shaft 17 via a one-way clutch 103A and a one-way clutch 103B, respectively. When the intermediate shaft 13 is selected, this intermediate shaft is engaged with the input shaft 100in via a directly coupled gear 101, and when the intermediate shaft 17 is selected, this intermediate shaft is engaged with the input shaft 100in via a directly coupled gear 102. The one-way clutches 103A, 103B are connected to shift actuators 29A, 29B, respectively.

A planetary gearing 31 that is a differential gearbox of a engine 200 for shift changing includes a sun gear, a planetary gear, and a ring gear. Two shafts are coaxially arranged at the left side of the planetary gearing 31 in the figure. The inner shaft of the two shafts is connected to the sun gear, and the outer shaft to the ring gear.

A driving force controller 210, shift-changing speed controller 220, and target shift-changing speed changeover device 230 of shift change control unit (CU) 200 respectively execute essentially the same control sequences as those described per FIGS. 5 to 16. Differences here exist in a maximum driving force and rotating speed of an electrical rotary machine 5, so internal control constants and others of the above control unit need to be adjusted. These constants that require adjustment can be easily discriminated from the foregoing expressions and other factors.

The shift change control system of an automobile, shown in FIG. 17, includes: a engine for vehicle driving; a engine for shift changing; an input shaft connected to the engine for vehicle driving; two input gears each provided on the input shaft and each capable of being engaged with/disengaged from the input shaft; a first intermediate shaft; a first driven gear provided on the first intermediate shaft and engaging with one of the input gears; a second intermediate shaft; a second driven gear provided on the second intermediate shaft and engaging with the other input gear; a first change gear train provided on the first intermediate shaft and capable of being engaged with/disengaged from the first intermediate shaft; a second change gear train provided on the second intermediate shaft and capable of being engaged with/disengaged from the second intermediate shaft; a third driven gear train that engages with the first change gear train and the second change gear train; and an output shaft connected in a common fashion to the third driven gear train. In this system, the engine for shift changing is adapted to be connectable between the first intermediate shaft and the second intermediate shaft.

For use as a shift change system to conduct active shift changes in combination with a motor, the present invention can not only be applied to the system constructions shown in FIGS. 4 and 16. The invention can also be similarly applied to the shift change systems of the constructions proposed by the present applicant in Japanese Application Patent Laid-Open Publication No. 2003-113934, Japanese Application Patent Laid-Open Publication No. 2004-190705, and Japanese Patent Application No. 2003-312078.

What is claimed is:

1. An automotive controller for shift changes, used with, and adapted to control a change gear ratio of, a transmission to connect a engine for vehicle driving, an electrical rotary machine, and axles via a differential gearbox, and conducts a shift change by transmitting power from the vehicle-driving engine to the axles via the electrical rotary machine during the shift change, wherein
the controller comprising:
a driving force control device to control driving force of the electrical rotary machine;
a shift-changing speed control device to issue a driving-force command from the electrical rotary machine to the driving force control device; and
a target shift-changing speed changeover device to output a target shift-changing speed as a target value of the shift-changing speed controlled by the shift-changing speed control device.

2. The automotive controller for shift changes according to claim 1, wherein the target shift-changing speed changeover device changes over the shift-changing speed according to a particular position of a switch or/and adjusting knob operable by a driver of the automobile, wherein the position of the switch or/and the adjusting knob is a position selected by the driver.

3. The automotive controller for shift changes according to claim 1, wherein the target shift-changing speed changeover device changes over the shift-changing speed according to a particular accelerator angle position of the automobile.

4. The automotive controller for shift changes according to claim 1, wherein the target shift-changing speed changeover device changes over the shift-changing speed according to a particular stepped-on state of a brake pedal of the automobile.

5. The automotive controller for shift changes according to claim 1, wherein the target shift-changing speed changeover device changes over the shift-changing speed according to particular changing speed of the accelerator.

6. The automotive controller for shift changes according to claim 1, wherein the shift-changing speed control device outputs the driving force of the electrical rotary machine on the basis of output torque of the vehicle-driving engine, target driving torque of the axles, and various kinds of inertial moment, inclusive of inertial moment of the electrical rotary machine.

7. The automotive controller for shift changes according to claim 1, wherein the target shift-changing speed changeover device changes over the shift-changing speed according to particular output torque of the vehicle-driving engine.

8. The automotive controller for shift changes according to claim 1, wherein the driving force control device controls an output of the electrical rotary machine so that constant torque of the axles is maintained.

9. The automotive controller for shift changes according to claim 1, wherein the target shift-changing speed changeover device changes over the shift-changing speed according to a particular rotating speed of the vehicle-driving engine.

10. The automotive controller for shift changes according to claim 1, wherein the driving force control device controls the driving force of the electrical rotary machine so that the vehicle-driving engine is maintained at a constant rotating speed.

11. The automotive controller for shift changes according to claim 1, wherein the target shift-changing speed changeover device changes over the shift-changing speed according to a particular ratio between a rotating speed of the vehicle-driving engine and a rotating speed of an output shaft.

12. The automotive controller for shift changes according to claim 1, wherein the target shift-changing speed changeover device changes over the shift-changing speed according to the amount of electricity stored in an electricity storage device.

13. The automotive controller for shift changes according to claim 1, wherein the target shift-changing speed changeover device changes over the shift-changing speed according to a particular transition level of a shift-changing operation.

14. An automatic transmission system of an automobile, comprising:
a shift change controller used for, and adapted to control a change gear ratio of, a transmission that connects a engine for vehicle driving, an electrical rotary machine, and axles via a differential gearbox, and conducts a shift change by transmitting power from the vehicle-driving engine to the axles via the electrical rotary machine during the shift change; and
an actuator controlled by the shift change controller;
wherein the shift change controller includes:
a driving force control device that controls driving force of the electrical rotary machine;
a shift-changing speed control device that issues a driving-force command from the electrical rotary machine to the driving force control device; and
a target shift-changing speed changeover device that outputs a target shift-changing speed as a target value of the shift-changing speed controlled by the shift-changing speed control device.

* * * * *